(12) United States Patent
Matsuo et al.

(10) Patent No.: US 9,278,395 B2
(45) Date of Patent: Mar. 8, 2016

(54) MILLING INSERT AND MILLING TIP-REPLACEMENT-TYPE ROTARY CUTTING TOOL

(75) Inventors: Shinya Matsuo, Tokyo (JP); Manabu Saito, Tokyo (JP); Hisayuki Oode, Tokyo (JP); Shoujirou Touma, Narita (JP)

(73) Assignees: FUJI JUKOGYO KABUSHIKI KAISHA, Tokyo (JP); MITSUBISHI HITACHI TOOL ENGINEERING, LTD., Tokyo (JP)

( * ) Notice: Subject to any disclaimer, the term of this patent is extended or adjusted under 35 U.S.C. 154(b) by 319 days.

(21) Appl. No.: 13/882,290

(22) PCT Filed: Oct. 26, 2011

(86) PCT No.: PCT/JP2011/074605
§ 371 (c)(1),
(2), (4) Date: Apr. 29, 2013

(87) PCT Pub. No.: WO2012/057173
PCT Pub. Date: May 3, 2012

(65) Prior Publication Data
US 2013/0223942 A1    Aug. 29, 2013

(30) Foreign Application Priority Data

Oct. 27, 2010  (JP) .................. 2010-240682

(51) Int. Cl.
*B23C 5/20* (2006.01)
*B23C 5/10* (2006.01)

(52) U.S. Cl.
CPC ............... *B23C 5/207* (2013.01); *B23C 5/109* (2013.01); *B23C 5/205* (2013.01);
(Continued)

(58) Field of Classification Search
CPC ... Y10T 407/24; Y10T 407/26; Y10T 407/27; Y10T 407/235; Y10T 407/245; Y10T 407/1924; B23C 5/205; B23C 5/207; B23C 5/2217; B23C 2200/323; B23C 2200/326; B23C 2200/087; B23C 2200/205; B23C 2200/206; B23C 2200/208
See application file for complete search history.

(56) References Cited

U.S. PATENT DOCUMENTS 3,701,187 A * 10/1972 Erkfritz ........................... 407/46
3,792,515 A *  2/1974 Lundgren ...................... 407/116
(Continued)

FOREIGN PATENT DOCUMENTS

JP    H04-261707 A    9/1992
JP    2000-141123 A  * 5/2000 ................ B23C 5/20
(Continued)

OTHER PUBLICATIONS

International Search Report for Application No. PCT/JP2011/074605 dated Dec. 13, 2011.
(Continued)

*Primary Examiner* — Sunil K Singh
*Assistant Examiner* — Ryan Rufo
(74) *Attorney, Agent, or Firm* — Smith, Gambrell & Russell, LLP

(57) ABSTRACT

A milling insert includes a polygonal tubular insert body which has: rake faces on one polygonal surface thereof, flanks composed of circumferential surfaces adjacent to the polygonal surface, and cutting edges defining a ridge line where the rake faces and flanks intersect each other as cutting edges. The rake faces have serrations where mount portions and valley portions are arrayed alternately to intersect the cutting edges. The ridge line has a waveform shape when the flanks are viewed from above. Bottom portions and top portions of the waveform are formed into concave circular arc portions and convex circular arc portions, respectively, and are alternately repeated. Both of the concave and convex circular arc portions are a ¼ circular arc or more to a ⅓ circular arc or less. Each of the concave circular arc portions is unevenly located between the convex circular arc portions adjacent thereto.

13 Claims, 19 Drawing Sheets

(52) U.S. Cl.
CPC ............... *B23C 2200/0405* (2013.01); *B23C 2200/0422* (2013.01); *B23C 2200/0444* (2013.01); *B23C 2200/0455* (2013.01); *B23C 2200/0477* (2013.01); *B23C 2200/082* (2013.01); *B23C 2200/086* (2013.01); *B23C 2226/27* (2013.01); *Y10T 407/1924* (2015.01); *Y10T 407/235* (2015.01)

(56) References Cited

U.S. PATENT DOCUMENTS

| | | | | |
|---|---|---|---|---|
| 4,140,431 | A | * | 2/1979 | Friedline et al. .............. 407/114 |
| 4,583,431 | A | * | 4/1986 | Komanduri et al. ............ 82/173 |
| 4,794,665 | A | * | 1/1989 | Peters .............................. 407/58 |
| 5,028,175 | A | * | 7/1991 | Pawlik ............................ 407/40 |
| 5,044,840 | A | * | 9/1991 | Fouquer et al. ............... 407/114 |
| 5,158,401 | A | * | 10/1992 | Pawlik ............................ 407/40 |
| 5,158,402 | A | | 10/1992 | Satran et al. |
| 5,562,370 | A | * | 10/1996 | Vogel et al. ..................... 407/42 |
| 5,626,189 | A | * | 5/1997 | Hutchinson .................. 166/55.6 |
| 5,722,803 | A | * | 3/1998 | Battaglia et al. .............. 407/119 |
| 6,413,023 | B1 | * | 7/2002 | Nagashima .................. 408/223 |
| 6,599,061 | B1 | * | 7/2003 | Nelson .......................... 407/114 |
| 6,945,740 | B2 | * | 9/2005 | Svenningsson et al. ........ 407/61 |
| 8,246,278 | B2 | | 8/2012 | Horiike et al. |
| 2002/0159846 | A1 | | 10/2002 | Horiike et al. |
| 2005/0260049 | A1 | * | 11/2005 | Kruszynski et al. .......... 408/223 |
| 2008/0304924 | A1 | * | 12/2008 | Engstrom et al. ............. 407/114 |
| 2009/0238649 | A1 | * | 9/2009 | Kruszynski et al. ............ 407/40 |
| 2010/0047026 | A1 | * | 2/2010 | Horiike et al. .................. 407/40 |
| 2010/0111619 | A1 | * | 5/2010 | Ballas et al. .................... 407/40 |
| 2011/0206470 | A1 | * | 8/2011 | Waki ............................. 407/119 |
| 2012/0107061 | A1 | * | 5/2012 | Harif ............................... 407/61 |
| 2012/0275868 | A1 | * | 11/2012 | Saito et al. ...................... 407/42 |
| 2012/0301235 | A1 | * | 11/2012 | Yoshioka et al. ............. 407/100 |
| 2014/0161545 | A1 | * | 6/2014 | Inagaki et al. .................. 407/42 |
| 2014/0341664 | A1 | * | 11/2014 | Meguro ........................ 407/119 |

FOREIGN PATENT DOCUMENTS

| | | | | |
|---|---|---|---|---|
| JP | 2003-039224 A | * | 2/2003 | ............... B23C 5/10 |
| JP | 2003-39225 A | | 2/2003 | |
| JP | 2006-110667 A | * | 4/2006 | ............. B23B 27/22 |
| JP | 2008-110451 A | | 5/2008 | |
| WO | 2008/032788 A1 | | 3/2008 | |

OTHER PUBLICATIONS

PCT Written Opinion (PCT/ISA/237) mailed Dec. 13, 2011 (in Japanese) for Application No. PCT/JP2011/074605.

English translation of the PCT Written Opinion of the International Searching Authority (PCT/ISA/237) mailed Dec. 13, 2011 for Application No. PCT/JP2011/074605.

PCT International Preliminary Report on Patentability (PCT/IB/373) issued Apr. 30, 2013 (in Japanese) for Application No. PCT/JP2011/074605.

English translation of PCT International Preliminary Report on Patentability (PCT/IB/373) issued May 14, 2013 for Application No. PCT/JP2011/074605.

* cited by examiner

US 9,278,395 B2

MILLING INSERT AND MILLING TIP-REPLACEMENT-TYPE ROTARY CUTTING TOOL

TECHNICAL FIELD

The present invention relates to a milling insert and an indexable face milling cutter.

BACKGROUND ART

Heretofore, in milling, an indexable face milling cutter has been used, in which inserts having cutting edges formed thereon are made exchangeable by being detachably attached to a tip end portion and circumferential portion of a body (shaft body) of a rotational cutting tool to be rotationally driven.

In the rotational cutting tool as described above, the cutting edges of the inserts are formed into a waveform shape in order to reduce cutting resistance and enhance chip control (Patent Literature 1).

PRIOR ART LITERATURES

Patent Literatures

Patent Literature 1: Japanese Patent Laid-Open Publication No. 2008-110451

SUMMARY OF THE INVENTION

Problem to be Solved by the Invention

However, a main purpose of the inserts having the conventional cutting edges with the waveform shape is cutting of a metal material. Since a chip of the metal material is prone to continue long, such an operation of finely cutting the metal material by the waveform-like cutting edges brings about an effect that the chip control is enhanced. Moreover, in the event of the cutting of the metal material, such an operation of cutting the metal material applies a large load to cutting edges, and causes a problem that the cutting edges are chipped, and accordingly, it is necessary to maintain strength of the cutting edges to be high.

Hence, from viewpoints of these necessities, that is, the chip control and the maintenance of the strength of the cutting edges, a shape of the waveform-like cutting edges is designed, and for the waveform-like cutting edges, a sine wave and the like have been frequently employed.

However, in cutting of fiber reinforced plastics (FRP), the chip control and the strength of the cutting edges are not highly required for the cutting edges in comparison with the cutting of the metal material. Therefore, in a purpose of the cutting of the FRP, there is room for contrivance for the waveform of the cutting edges of the inserts in order to enhance characteristics thereof with regard to the reduction of the cutting resistance and the like.

In this connection, it is an object of the present invention to provide a milling insert, in which cutting resistance is reduced, hence, wear advance of cutting edges is suppressed, and elongation of a lifetime is achieved, and to provide an indexable face milling cutter.

It is another object of the present invention to improve wear resistance of the cutting edges and to achieve further elongation of the lifetime.

Means for Solving Problems

In order to solve the above problem, an embodiment of the invention includes a milling insert, in which rake faces are provided on one polygonal surface in a polygonal tabular insert body, a circumferential surface adjacent to the polygonal surface is defined as flanks, and cutting edges are formed, the cutting edges defining a ridge line where the rake faces and the flanks intersect each other as cutting edges, wherein, on the rake faces, serrations, in which pluralities of mount portions and valley portions are arrayed alternately, are formed so as to intersect the cutting edges, when the flanks are viewed from above, the ridge line is formed into a waveform shape, in which bottom portions are formed into concave circular arc portions, top portions are formed into convex circular arc portions, and the concave circular arc portions and the convex circular arc portions are alternately repeated, both of the concave circular arc portions and the convex circular arc portions are a ¼ circular arc or more to a ⅓ circular arc or less, and each of the concave circular arc portions is unevenly located at a position close to one of two of the convex circular arc portions adjacent to the concave circular arc portion, and far from the other of the two convex circular arc portions.

In an embodiment of the invention, the ridge line is formed into a shape in which the concave circular arc portion and the convex circular arc portion far from the concave circular arc portion are connected to each other by a straight line, the far convex circular arc portion being one of the two convex circular arc portions adjacent to the concave circular arc portion.

In an embodiment of the invention, the ridge line is formed into a shape in which the concave circular arc portion and the convex circular arc portion close to the concave circular arc portion are connected to each other by a straight line, the close convex circular arc portion being one of the two convex circular arc portions adjacent to the concave circular arc portion.

In an embodiment of the invention, the ridge line is formed into a shape in which the concave circular arc portion and the convex circular arc portion close to the concave circular arc portion are directly connected to each other, the close convex circular arc portion being one of the two convex circular arc portions adjacent to the concave circular arc portion.

In an embodiment of the invention, a virtual chord that connects both end points of each of the convex circular arc portions to each other is inclined to the concave circular arc portion closer to the convex circular arc portion, the concave circular arc portion being one of two of the concave circular arc portions adjacent to the convex circular arc portion.

In an embodiment of the invention, the milling insert is configured so as to be attachable to a body of a rotational cutting tool while setting, within ±5 degrees, a deviation angle between a tangential line of the convex circular arc portion, the tangential line passing through a midpoint of the convex circular arc portion, and a straight line that passes through the midpoint and is perpendicular to a tool revolution axis.

In an embodiment of the invention, the ridge line is formed at a gradually narrower pitch at a time of being traced with respect to the concave circular arc portion toward a direction where the convex circular arc portion closer to the concave circular arc portion is present, the convex circular arc portion being one of the two convex circular arc portions adjacent to the concave circular arc portion.

In an embodiment of the invention, the milling insert is coated with a polycrystalline diamond film.

In an embodiment of the invention, a base body of the insert is composed of a cemented carbide-made member, and in addition, the cutting edges are composed of a highly hard member made of cubic boron nitride sintered body bonded to the base body or made of polycrystalline diamond bonded to the base body.

In an embodiment of the invention, the cutting edges include wiper edges between a range of the waveform shape, in which the concave circular arc portions and the convex circular arc portions are alternately repeated, and corners of the polygonal surface.

In an embodiment of the invention, the insert is freely detachably attached to a tip end portion of a milling cutter body to be rotationally driven.

In an embodiment of the invention, in a state where the insert is mounted on the tip end portion of the milling cutter body, when there is assumed a line segment that connects a lowest point of the cutting edges and an equivalent point on a side adjacent to a side including the lowest point outward in a radius direction of a tool revolution axis to each other, an angle made by the line segment and a plane that includes the lowest point and is perpendicular to the tool revolution axis is 5 degrees or more to 30 degrees or less.

In an embodiment of the invention, the insert is attached to the milling cutter body while setting, within ±5 degrees, the deviation angle between the tangential line of the convex circular arc portion, the tangential line passing through the midpoint of the convex circular arc portion, and the straight line that passes through the midpoint and is perpendicular to the tool revolution axis.

In an embodiment of the invention includes, an indexable face milling cutter, in which the insert is freely detachably attached to a tip end portion of a milling cutter body to be rotationally driven, wherein, in a state where the insert is mounted on the tip end portion of the milling cutter body, under conditions where a plane that includes a lowest point of the cutting edges and is perpendicular to a tool revolution axis is taken as an angle reference, and where the lowest point is taken as an observation point, each of the wiper edges is formed over a predetermined length within a range where an angle of elevation is 1 degree or less.

Advantageous Effect of the Invention

In accordance with the present invention, the cutting resistance is reduced, and accordingly, there is an effect that the wear advance of the cutting edges is suppressed, leading to the elongation of the lifetime of the insert for the milling.

BEST MODE FOR CARRYING OUT THE INVENTION

A description is made below of an embodiment of the present invention with reference to the drawings. The following describes an embodiment of the present invention, and does not limit the present invention.

Figure 1:
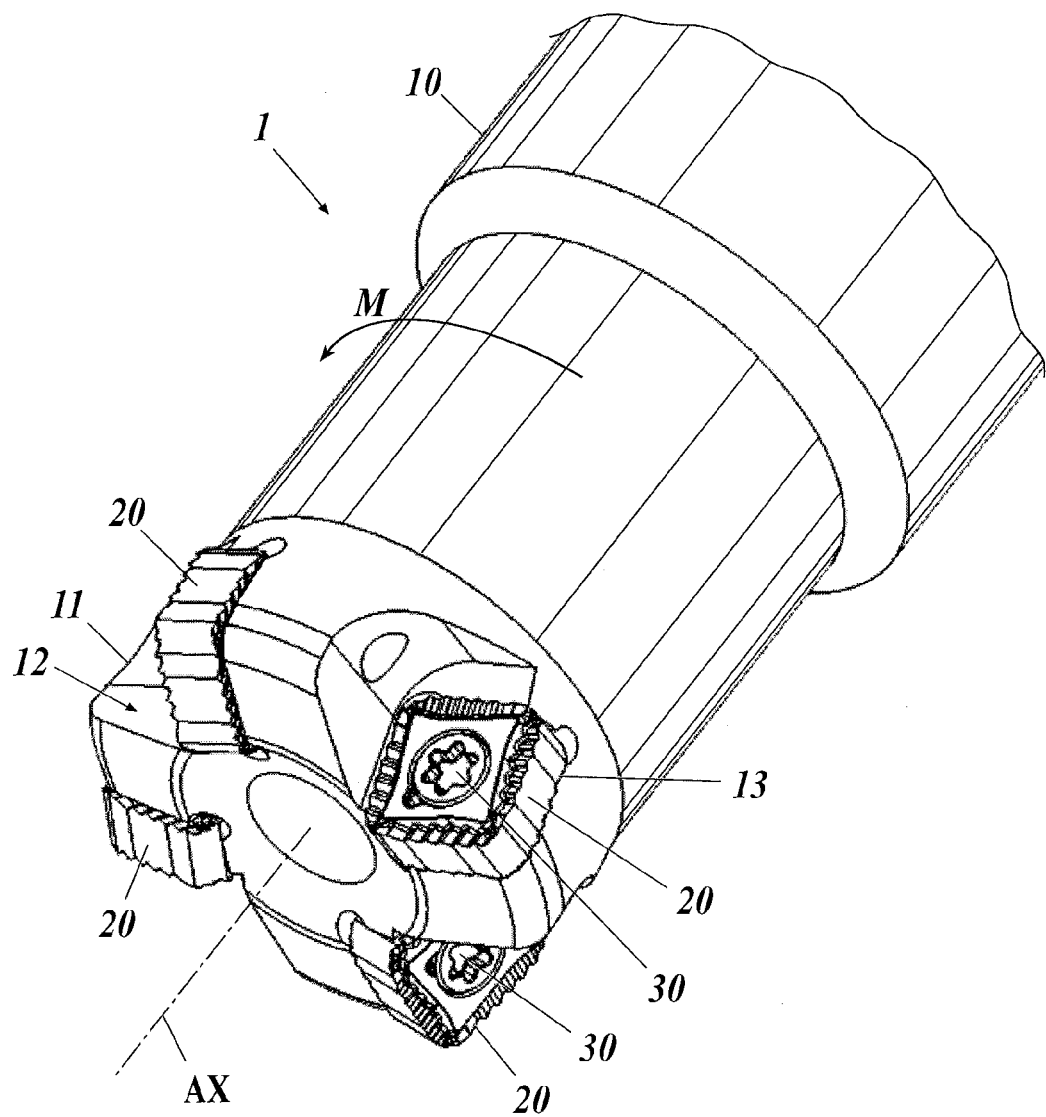
FIG. 1 is a perspective view of an indexable face milling cutter according to an embodiment of the present invention.

As shown in FIG. 1, an indexable face milling cutter 1 according to this embodiment includes: a milling cutter body 10; and milling insert 20.

The tool body 10 is a shaft body that is attached to a main shaft of a milling machine and rotationally driven. A center axis of the tool body 10 corresponds to a tool revolution axis AX.

The inserts 20 are detachably attached to a tip end portion 11 of the tool body 10. The number of attached inserts 20 is arbitrary. FIG. 1 illustrates an example where four inserts 20 are equally attached along a circumference of the tip end portion 11.

Figure 2A:
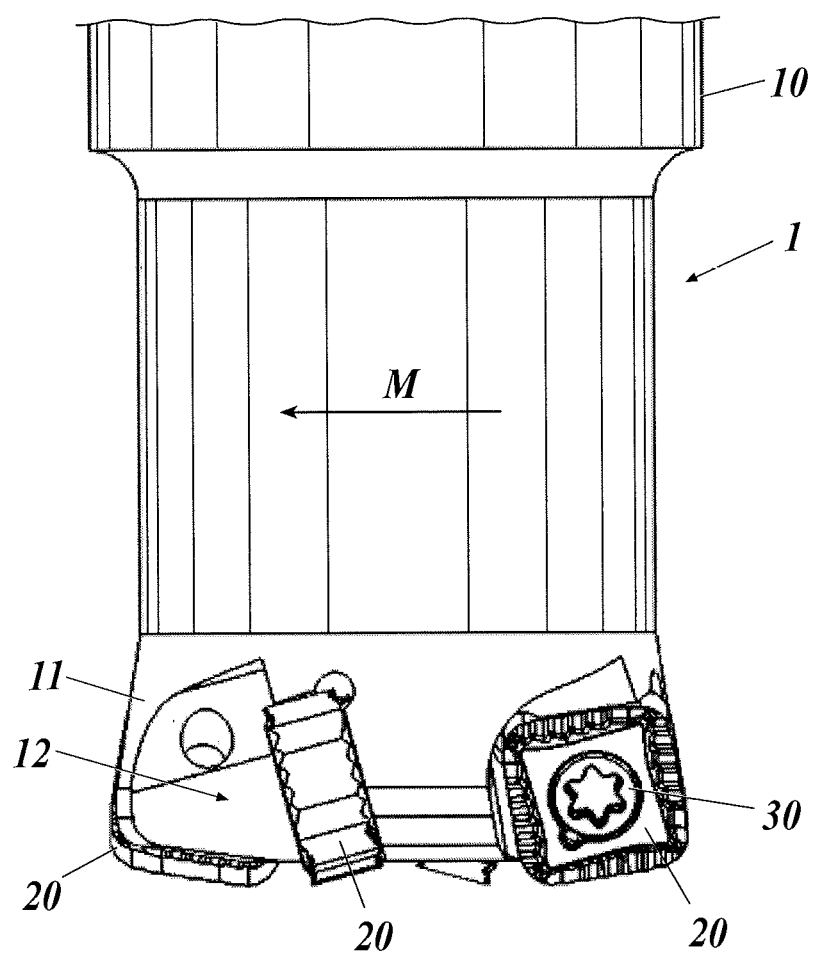
FIG. 2A is a side view of the indexable face milling cutter according to the embodiment of the present invention.
Figure 2B:
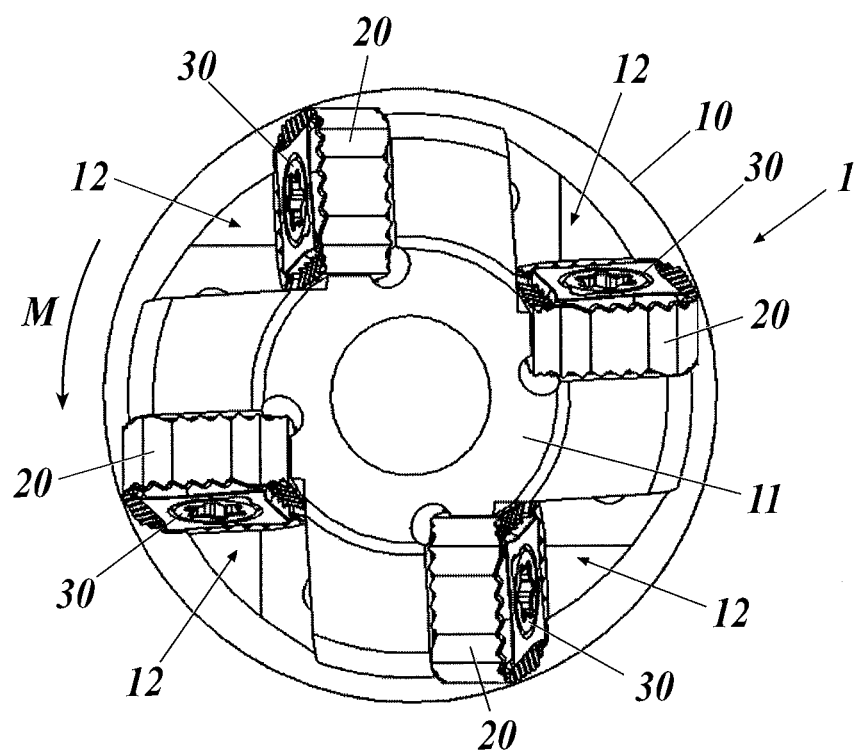
FIG. 2B is a tip end surface view of the indexable face milling cutter according to the embodiment of the present invention.

On the tip end portion 11, chip pockets 12 and insert attachment seats 13 are formed. The inserts 20 are mounted on the insert attachment seats 13, and are fixed to the tool body 10 by attachment screws 30. As shown in FIG. 1, FIG. 2A and FIG. 2B, the inserts 20 are fixed to the tool body 10 at a constant angle. That is to say, the inserts 20 are fixed at a negative axial rake angle Ar as shown in FIG. 2A and at a negative radial rake angle Rr as shown in FIG. 2B.

Figure 3:
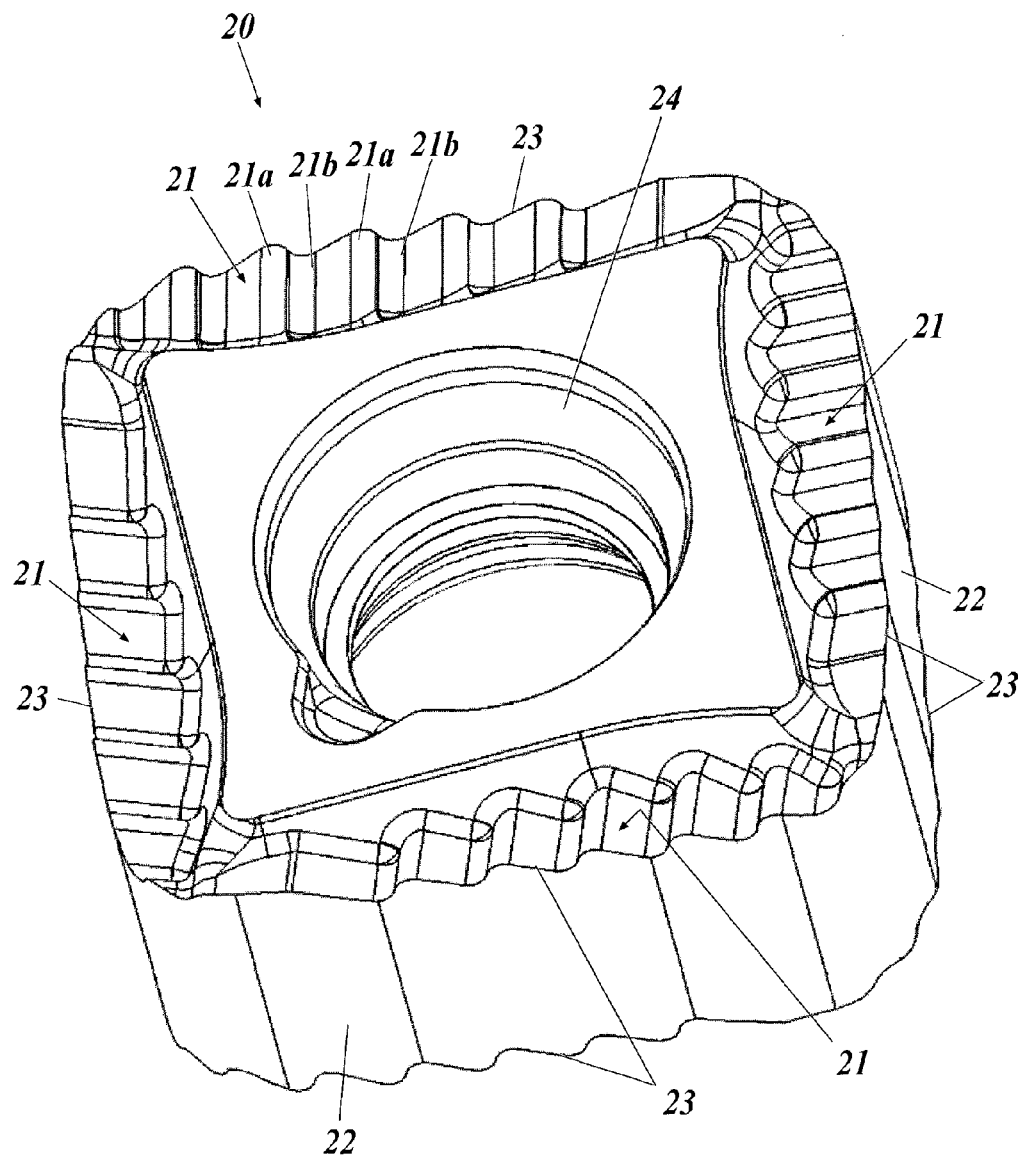
FIG. 3 is a perspective view of a milling insert according to the embodiment of the present invention.
Figure 12:
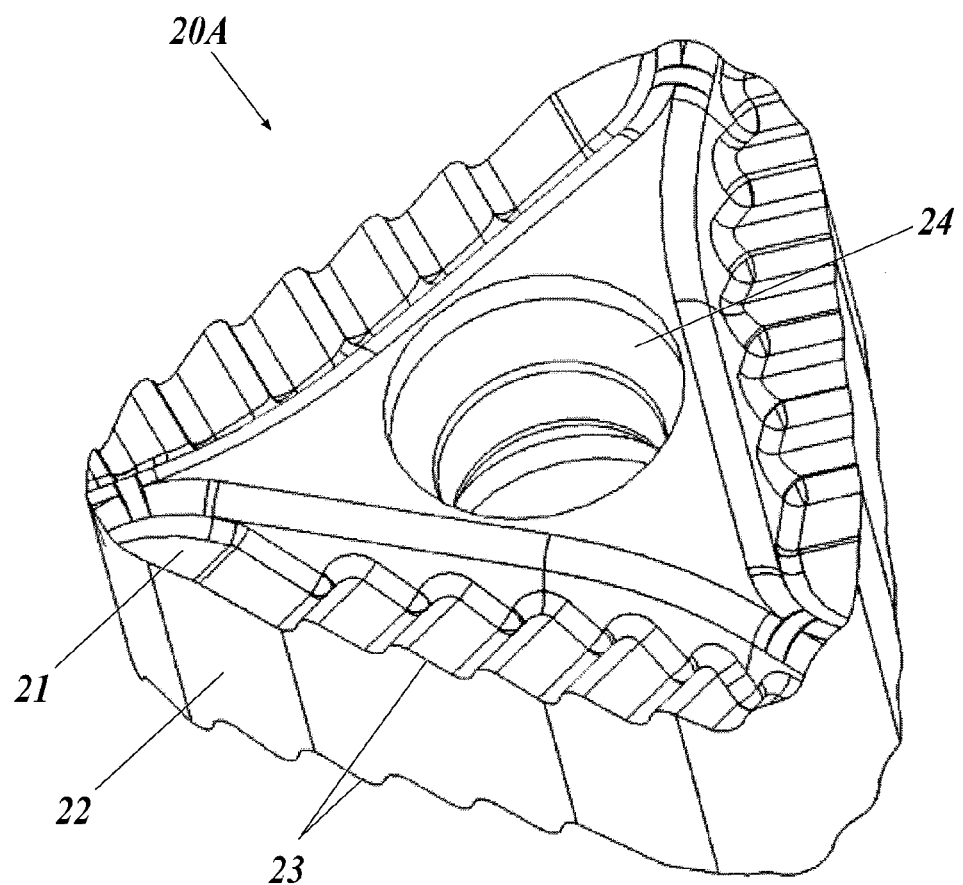
FIG. 12 is a perspective view of a triangular tabular insert for the milling according to another embodiment of the present invention.
Figure 13:
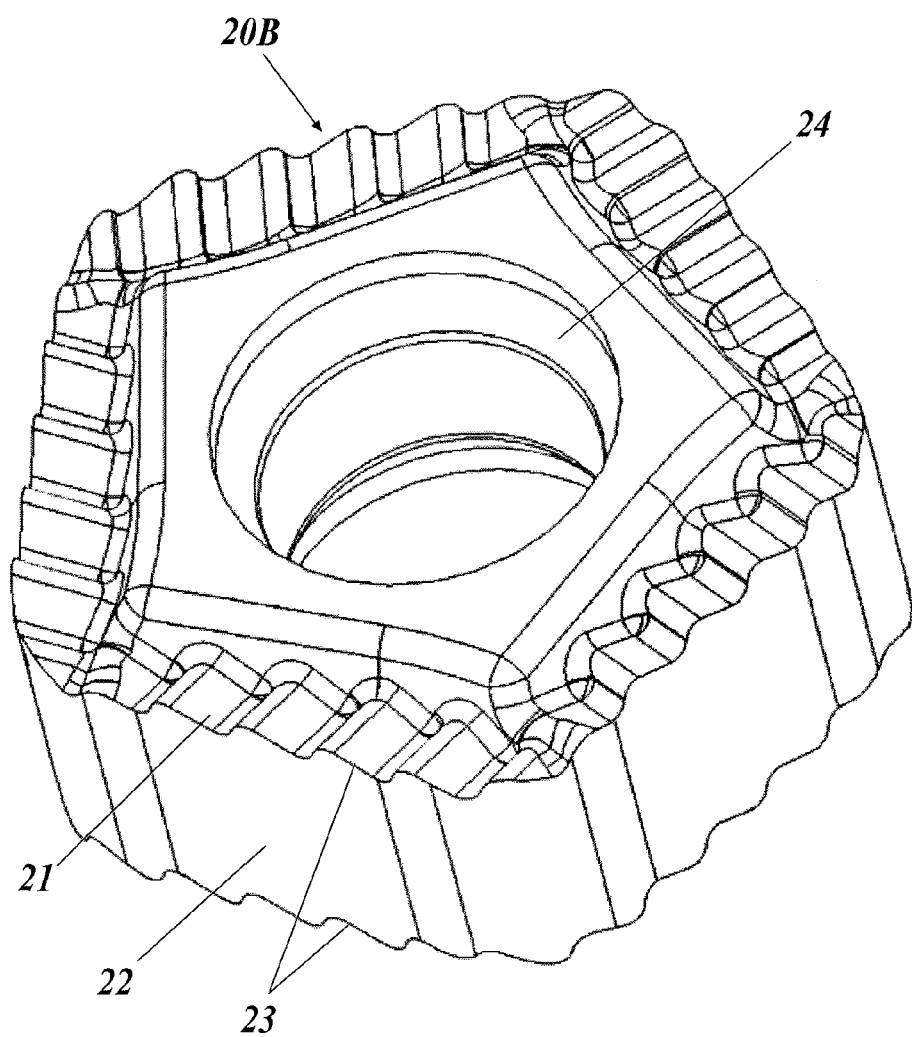
FIG. 13 is a perspective view of a pentagonal tabular insert for the milling according to another embodiment of the present invention.
Figure 14:
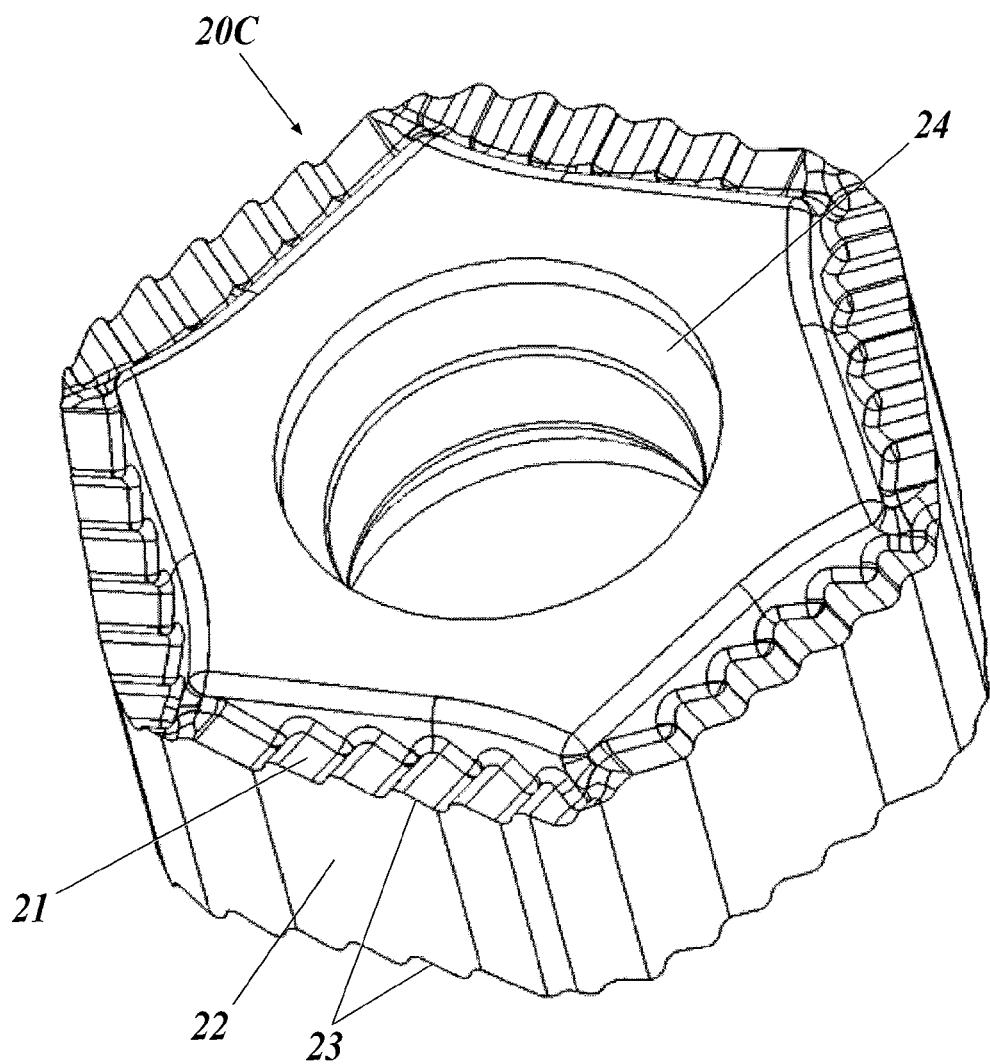
FIG. 14 is a perspective view of a hexagonal tabular insert for the milling according to another embodiment of the present invention.
Figure 15:
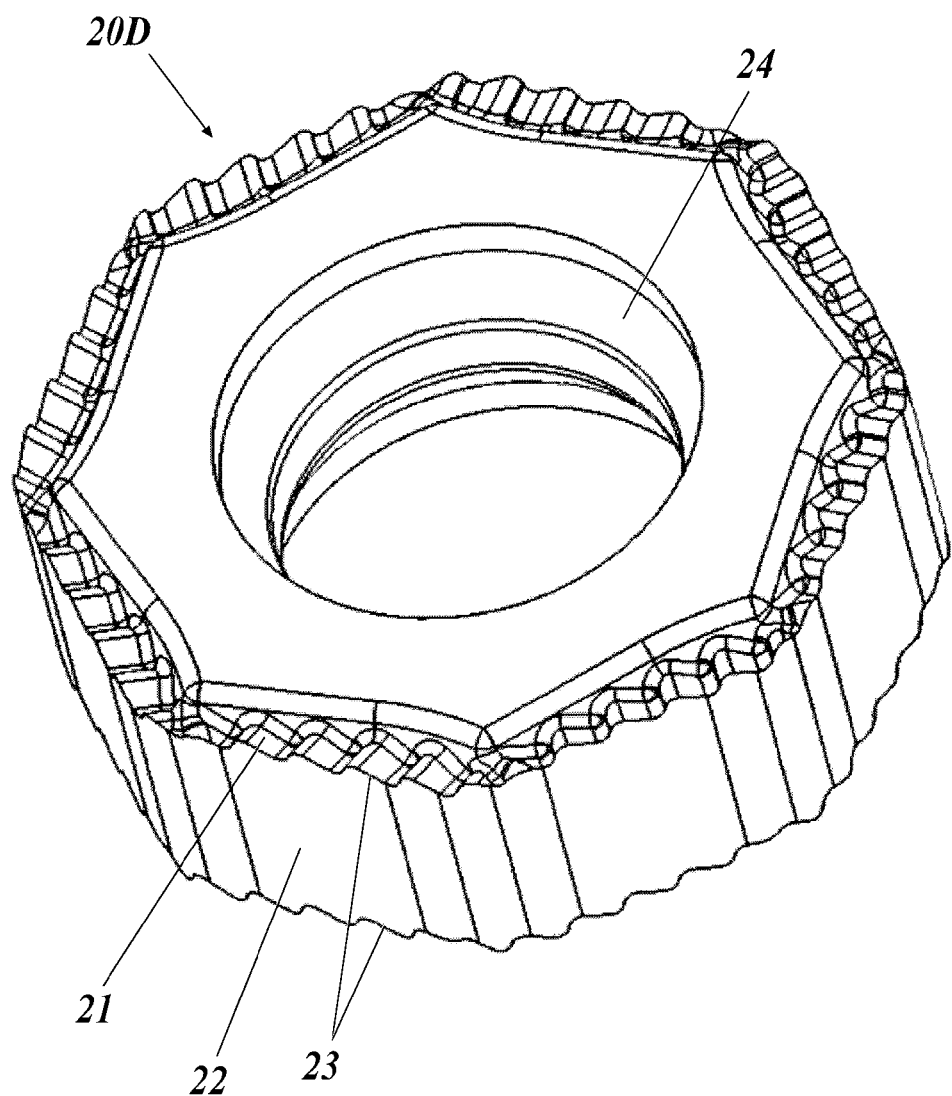
FIG. 15 is a perspective view of an octagonal tabular insert for the milling according to another embodiment of the present invention.

As shown in FIG. 3, each of the inserts 20 composes a polygonal tabular body. The insert 20 in this embodiment composes a quadrangular tabular body; however, the present invention can be embodied even if the insert 20 is formed into a triangular shape as shown in FIG. 12 and into a pentagonal shape or more as shown in FIG. 13 to FIG. 15.

An outer shape of the insert 20 as shown in FIG. 3 is formed of: two polygonal surfaces opposite with each other; and a circumferential surface adjacent thereto. Rake faces 21 are provided on the polygonal surfaces. The circumferential surface is defined as flanks 22.

Cutting edges, in which intersection ridge lines 23 between the rake faces 21 and the flanks 22 are defined as cutting edges, are formed.

In a similar way to the above, also in inserts 20A to 20D shown in FIG. 12 to FIG. 15, an outer shape of each thereof is formed of: two polygonal surfaces opposite with each other; and a circumferential surface adjacent thereto. Rake faces 21 are provided on the polygonal surfaces. The circumferential surface is defined as flanks 22. Cutting edges, in which intersection ridge lines 23 between the rake faces 21 and the flanks 22 are defined as cutting edges, are formed.

In any of the polygonal tabular inserts in which the number of corners of the polygonal surfaces is mutually different, with regard to a form of a waveform shape to be formed on such cutting edge ridge lines 23, and to functions and effects, which are brought thereby, similar ones to those of a quadrangular tabular body to be described later can be obtained.

Moreover, a shape of the insert is formed into such a polygonal tabular shape, and the number of corners thereof is increased, whereby there can be obtained an insert made capable of economical and efficient cutting by increasing the number of effective cutting edges usable sequentially in the one insert, and an indexable face milling cutter on which this insert is mounted.

In the polygonal tabular insert, a variety of cutting conditions and the like at the time of cutting are sometimes changed depending on the number of corners of the polygonal surfaces, and accordingly, it is necessary to select appropriate conditions with regard to this point.

For example, in the case where an angular δ value (which refers to a cutting edge angle in general) is assumed to be constant, then with regard to an axial cut depth as a cutting condition, it becomes difficult to set a larger value as the number of corners of the polygonal surfaces is increased. However, in cutting of an FRP material, a possibility that the axial cut depth may be set large is low, and accordingly, even if the insert body is octagonal tabular, it can be said that there are less restrictions such that the material concerned must be processed while reducing the axial cut depth.

Figure 16:
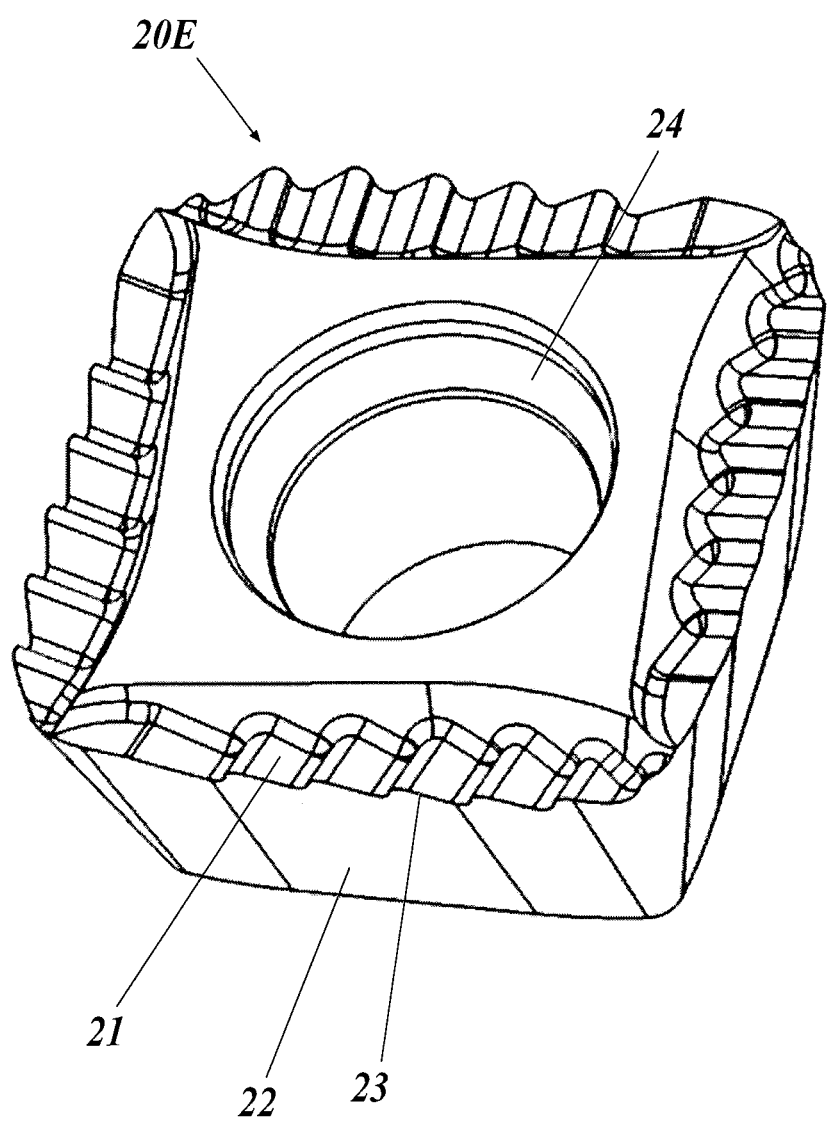
FIG. 16 is a perspective view of a positive-type quadrangular tabular insert for the milling according to another embodiment of the present invention.

Note that, for the inserts 20, 20A, 20B, 20C and 20D, which are described above, negative types are illustrated. As opposed to this, an insert 20E shown in FIG. 16 is of a positive type.

In the negative insert, the rake faces 21 can be arranged on both of two polygonal surfaces of an insert body, which are opposite with each other, whereby cutting edges can be formed, and the negative insert can be used while sequentially changing sides thereof to be arranged on a tool tip end in the event of being attached to the tool body 10. Accordingly, the number of effective cutting edges usable sequentially can be doubled in comparison with the positive inserts. For example, in the octagonal tabular negative insert 20D, the number of effective cutting edges usable sequentially can be set at 16, which is equal to (number of sides of octagon)×(number of octagonal surfaces: 2). However, since a relative angle between the rake faces 21 and the flanks 22 is 90 degrees, the negative insert 20D is fixed to the tool body 10 at the negative axial rake angle (Ar) as mentioned above, and the axial rake angle (Ar) cannot be made positive.

As opposed to this, in the positive insert, though the number of effective cutting edges usable sequentially is reduced by half, the axial rake angle (Ar) can be made positive, resulting in a preferable shape for reducing resistance at the time of the cutting.

Incidentally, on the rake faces 21, serrations, in which a plurality of mount portions 21a, 21a . . . and a plurality of valley portions 21b, 21b . . . are arrayed alternately, are formed so as to intersect the cutting edges.

In the insert 20, an attachment hole 24, which penetrates the polygonal surfaces opposite with each other, is formed, and the above-mentioned attachment screw 30 is inserted thereinto.

Figure 4A:
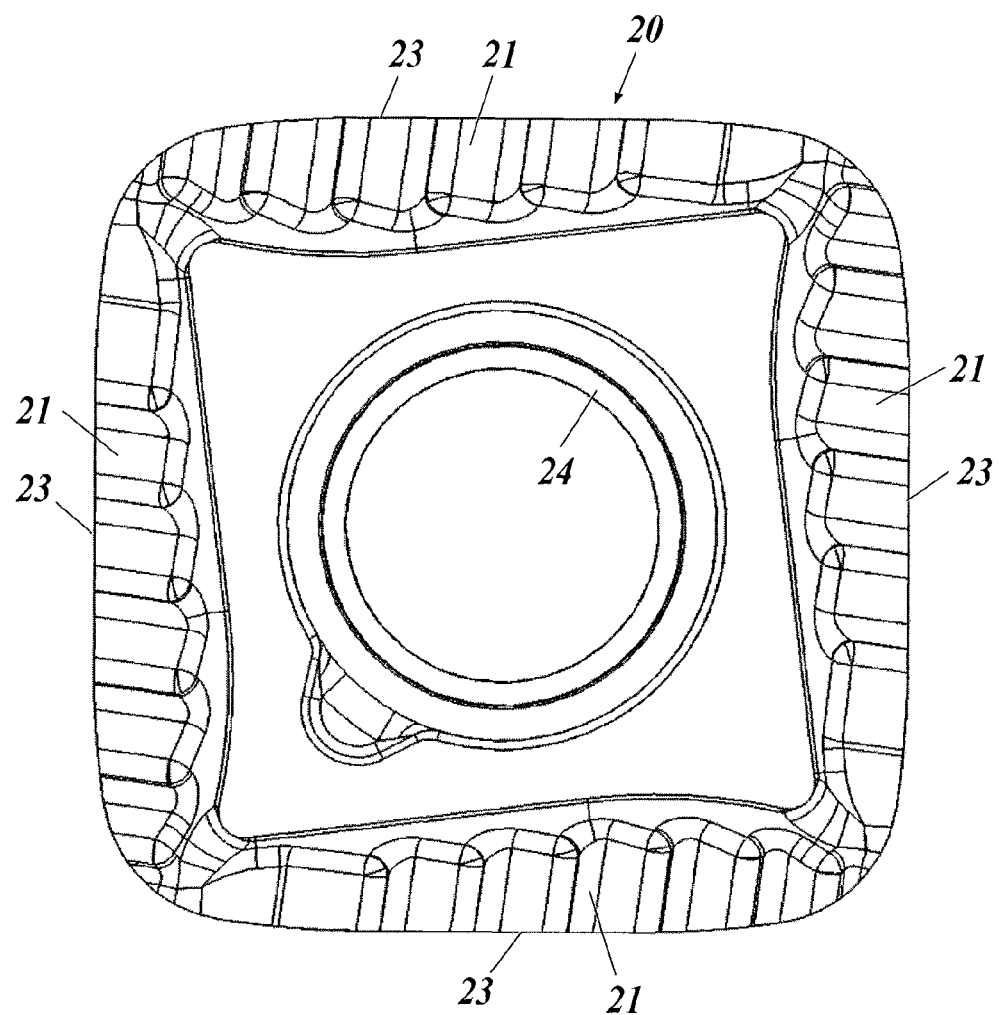
FIG. 4A is a plan view showing one of polygonal surfaces of the insert for the milling according to the embodiment of the present invention.
Figure 4B:
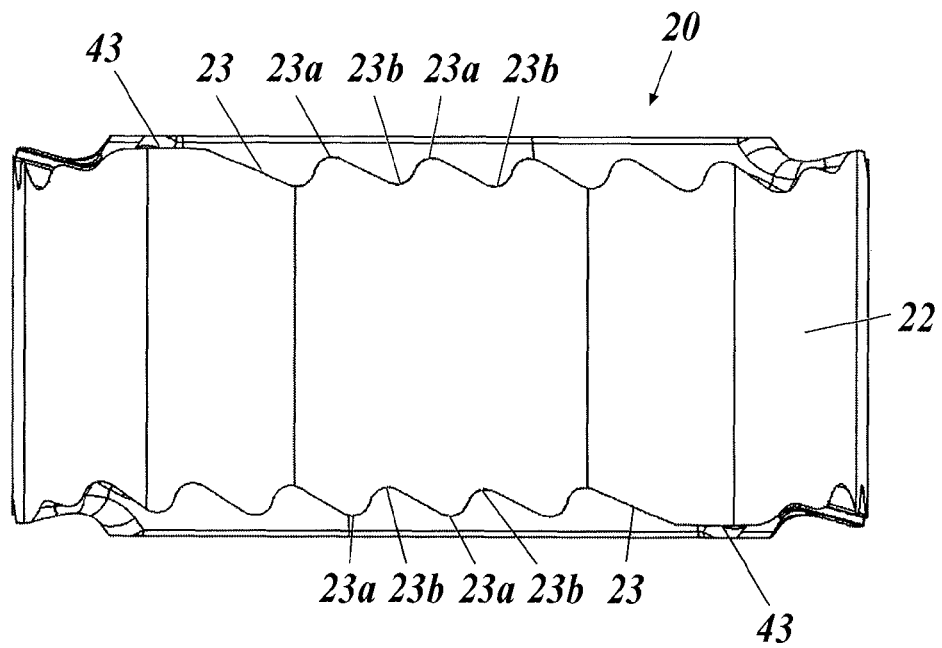
FIG. 4B is a side view showing a part of a circumferential surface of the insert for the milling according to the embodiment of the present invention.

As shown in FIG. 4B, when the flanks 22 are viewed from the above, the ridge lines (hereinafter, referred to as "cutting edge ridge lines") 23 which form the cutting edges of the cutting edges are formed into a waveform shape, in which bottom portions are formed into concave circular arc portions 23b, top portions are formed into convex circular arc portions 23a, and these are alternately repeated. A description is made below in detail of the shape of the cutting edge ridge lines 23 with reference to FIG. 5 to FIG. 9.

Figure 5A:
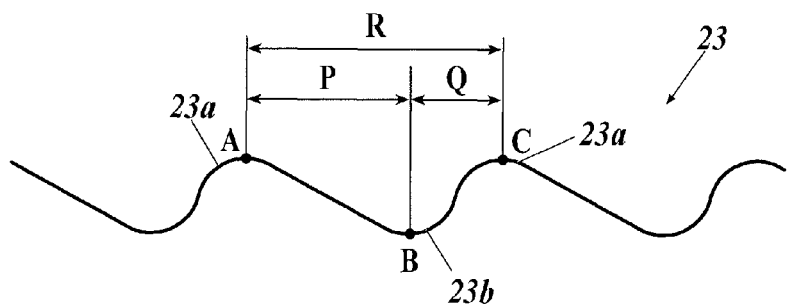
FIG. 5A is an explanatory view showing the cutting edge ridge line of the insert for the milling according to the embodiment of the present invention.

As shown in FIG. 5A, one upper vertex of the cutting edge ridge line 23 is defined as A, one upper vertex adjacent to the upper vertex A is defined as C, and a lower vertex between the upper vertices A and C is defined as B. Moreover, a distance between the vertices A and C is defined as R, a distance between the vertices A and B is defined as P, and a distance between the vertices B and C is defined as Q. Then, this insert 20 fulfills a condition of P>Q.

That is to say, each of the concave circular arc portions 23b is unevenly located at a position close to one (that is, the convex circular arc portion 23a including the upper vertex C) of the two convex circular arc portions 23a and 23a, which are adjacent thereto, and far from the other (that is, the convex circular arc portion 23a including the upper vertex A) of the two convex circular arc portions 23a and 23a.

As described above, such convex circular arc portions of the cutting edges having the waveform shape are unevenly located, whereby an occurrence of uneven wear can be suppressed, and a reduction effect of the cutting resistance can also be obtained. Meanwhile, in the case of such a waveform shape in which the convex circular arc portions are not unevenly located, for example, in the case of a sine wave shape, then wear of an inner circumference side of the convex circular arc portions advances preferentially, accordingly, a lifetime of the cutting edges is shortened, and the reduction effect of the cutting resistance cannot be obtained, either.

Moreover, both of the concave circular arc portions 23b and the convex circular arc portions 23a are a ¼ circular arc or more to a ⅓ circular arc or less. Note that, when the above is complemented, a central angle of the ¼ circular arc is 90°, and a central angle of the ⅓ circular arc is 1200.

Figure 5B:
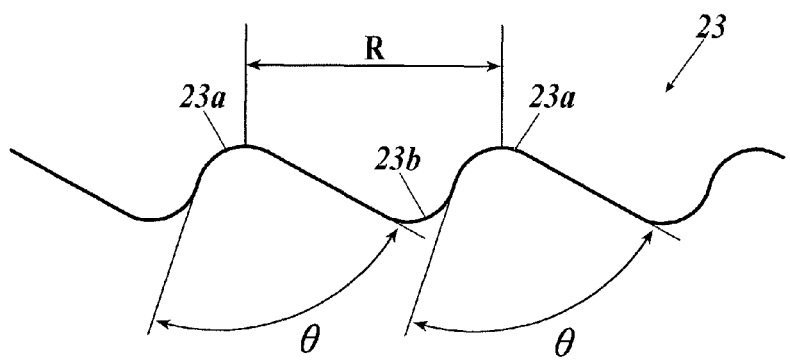
FIG. 5B is an explanatory view showing the cutting edge ridge line of the insert for the milling according to the embodiment of the present invention.

Hence, when an angle on a side including a center of the circular arc concerned, the angle being made by tangential lines on both end points of the convex circular arc portions 23a as shown in FIG. 5B, is defined as θ (wedge angle), this insert 20 fulfills a condition of 60°≤θ≤90°.

In the present invention, in the case where such a circular arc portion is set at the ¼ circular arc, a normal wear state can be obtained since the cutting edges have a good balance between the cutting resistance and the strength of the cutting edges. When this state is gradually shifted to a state of the ⅓ circular arc, then such a θ value is reduced, and a value of the cutting resistance is reduced; however, the strength of the cutting edges tends to be lowered. Accordingly, the circular arc portion is regulated to the ⅓ circular arc or less in order to minimize an occurrence of micro chipping in the vicinity of each vertex of the convex circular arc portions.

That is to say, when the circular arc portion is set at a 5/12 circular arc larger than the ⅓ circular arc, then the cutting resistance is reduced; however, the strength of each cutting edge becomes insufficient, causing a disadvantage that a part of the convex circular arc portion is chipped off. Meanwhile, when the circular arc portion is set at a ⅙ circular arc less than the ¼ circular arc, then the reduction effect of the cutting resistance cannot be obtained.

Moreover, the cutting edge ridge line 23 is formed at a gradually narrower pitch at the time of being traced with respect to the concave circular arc portion 23b toward a direction where the convex circular arc portion 23a closer to the concave circular arc portion 23b is present, the convex circular arc portion 23a being one of the two convex circular arc portions 23a and 23a adjacent to the concave circular arc portion 23b. This is described with reference to FIG. 5C.

Figure 5C:
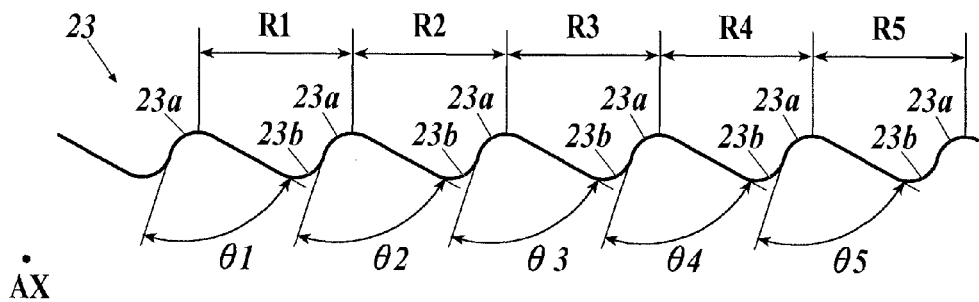
FIG. 5C is an explanatory view showing the cutting edge ridge line of the insert for the milling according to the embodiment of the present invention.

The cutting edge ridge line 23 is arranged in an orientation as shown in FIG. 5C with respect to the tool revolution axis AX (note that, FIG. 5C does not show an accurate distance between the cutting edge ridge line 23 and the tool revolution axis AX). That is to say, a direction from the upper vertex C shown in FIG. 5A toward the upper vertex A shown therein is on the inner circumference side of the rotation.

The above-mentioned distance R corresponds to the pitch of such repeated shapes of the cutting edge ridge line 23. As shown in FIG. 5C, when the pitch R is defined as R1, R2, R3 . . . sequentially from the inner circumference side of the rotation, which is closer to the tool revolution axis AX, toward an outer circumference side thereof, then this insert fulfills a condition of R1>R2>R3> . . . .

As described above, such a pitch interval is set so as to become the gradually narrower pitch in the direction from the inner circumference side of the tool revolution toward the outer circumference side thereof in a state where the insert is mounted on the tool body, whereby the cutting resistance of the cutting edges is reduced on the outer circumference portion where the cutting load becomes highest during the process, and the normal wear state can be obtained.

Note that θ is also defined as θ1, θ2, θ3 . . . sequentially from the inner circumference side closer to the tool revolution axis AX toward the outer circumference side as shown in FIG. 5C. In this insert, the cutting edge ridge line is formed under a condition of θ1=θ2=θ3, that is, under a condition where θ is constant. Without fussing over this, the present invention may be embodied while changing θ. For example, θ1>θ2>θ3 may be established so that the convex circular arc portions 23a can be sharper on the outer circumference side.

The cutting edge ridge line 23 of this insert 20 is formed into a shape in which the concave circular arc portion 23b and the convex circular arc portion 23a far therefrom are connected to each other by a straight line, the far convex circular arc portion 23a being one of the two convex circular arc portions 23a and 23a adjacent to the concave circular arc portion 23b concerned. Moreover, the cutting edge ridge line 23 of this insert 20 is formed into a shape in which the concave circular arc portion 23b and the convex circular arc portion 23a close thereto are connected to each other by a straight line, the close convex circular arc portion 23a being one of the two convex circular arc portions 23a and 23a adjacent to the concave circular arc portion 23b concerned.

Figure 6:
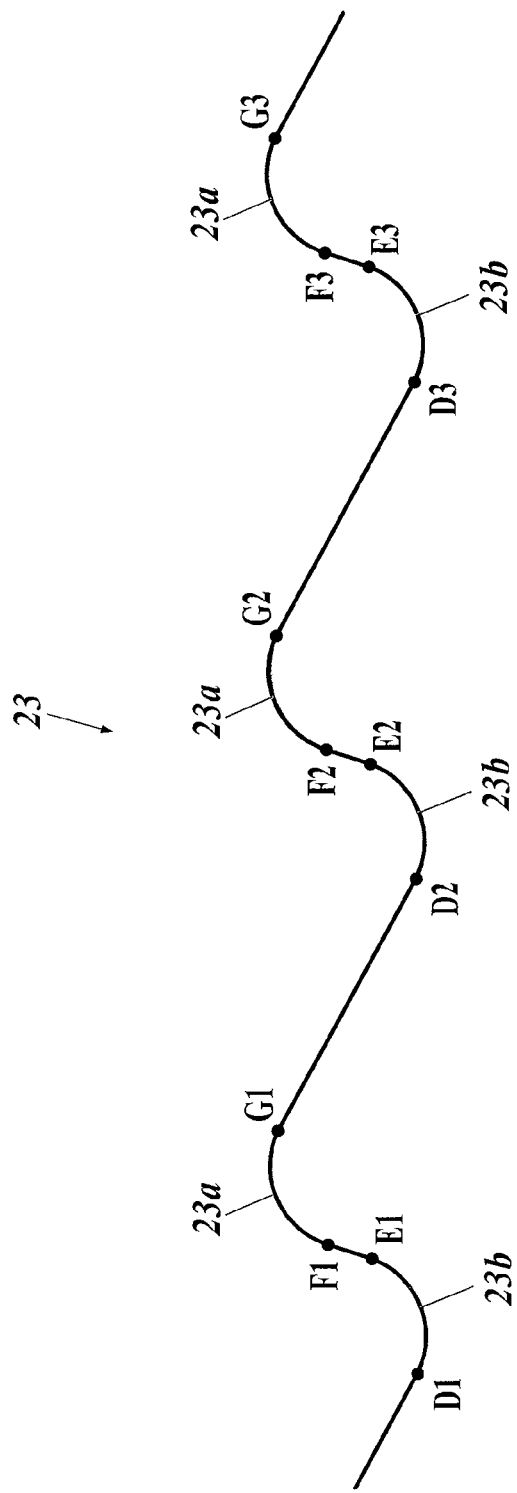
FIG. 6 is an explanatory view showing the cutting edge ridge line of the insert for the milling according to the embodiment of the present invention.

That is to say, as shown in FIG. 6, when both end points of the concave circular arc portions 23b are defined as (D1, E1), (D2, E2) . . . , and both end points of the convex circular arc portions 23a are defined as (F1, G1), (F2, G2) . . . , then a section (E1-F1), a section (G1-D2), a section (E2-F2), a section (G2-D3) . . . are linear.

Moreover, in this insert 20, also at connecting points between these section straight lines and the convex circular arc portions 23a and the concave circular arc portions 23b, the section straight lines and the convex circular arc portions 23a and the concave circular arc portions 23b are connected to each other so that an inclination of the cutting edge ridge line 23 can be changed continuously. Specifically, when the section straight line E1-F1 is taken as a representative, the straight line E1-F1 is a common tangential line to the concave circular arc portion 23b in which the point E1 is one end point and to the convex circular arc portion 23a in which the point F1 is one end point. Other section straight lines are also common tangential lines to the circular arc portions adjacent to each other.

Figure 7:
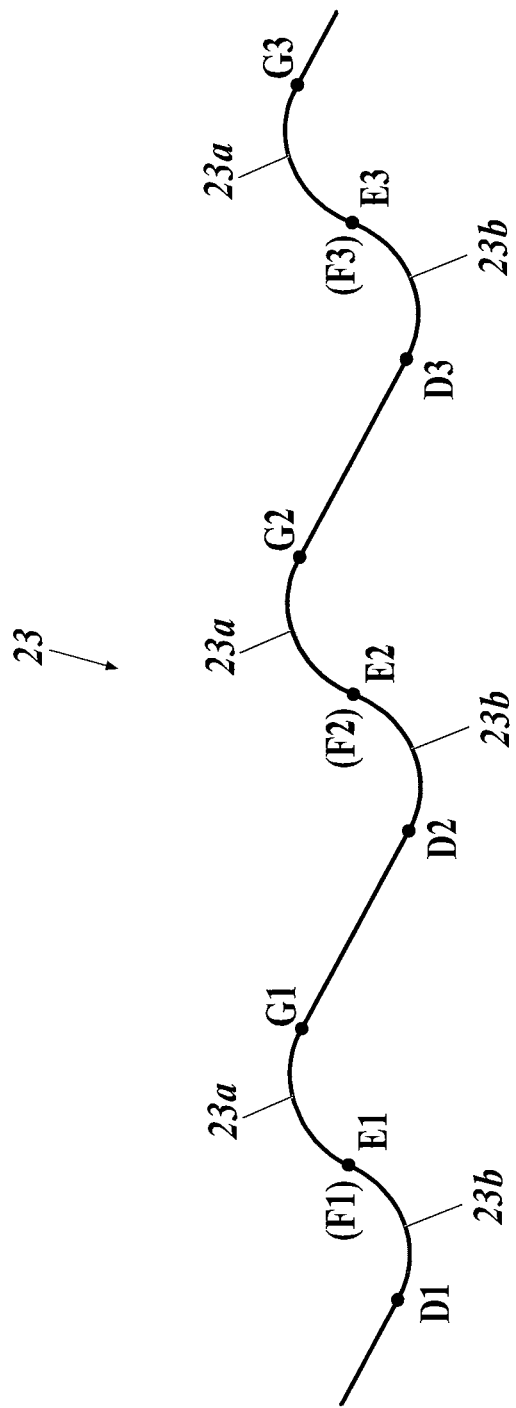
FIG. 7 is an explanatory view showing a cutting edge ridge line of an insert for the milling according to another embodiment of the present invention.

Note that, without fussing over this embodiment, such a configuration as shown in FIG. 7 is also possible, in which the points E1, E2, E3 . . . and the points F1, F2, F3 are made common to each other, and the concave circular arc portions 23b and the convex circular arc portions 23a, which are relatively closely adjacent to each other, are directly connected to each other. That is to say, it is also possible to form the cutting edge ridge line into a shape in which the concave circular arc portion 23b and the convex circular arc portion 23a closer thereto are directly connected to each other, the closer convex circular arc portion 23a being one of the two convex circular arc portions 23a and 23a adjacent thereto.

As described above, variations are conceived, which include: the one in which the respective convex circular arc portions and the respective concave circular arc portions are coupled to each other by free-form curves; the one in which the convex circular arc portions and the concave circular arc portions are coupled to each other by straight lines; the one in which the convex circular arc portion far from the concave circular arc portion is coupled thereto by a straight line, and the convex circular arc portion close to the concave circular arc portion is coupled thereto directly; and the like. However, in the case where these are compared with one another, it is conceived that these exhibit substantially equivalent performance.

Figure 8:
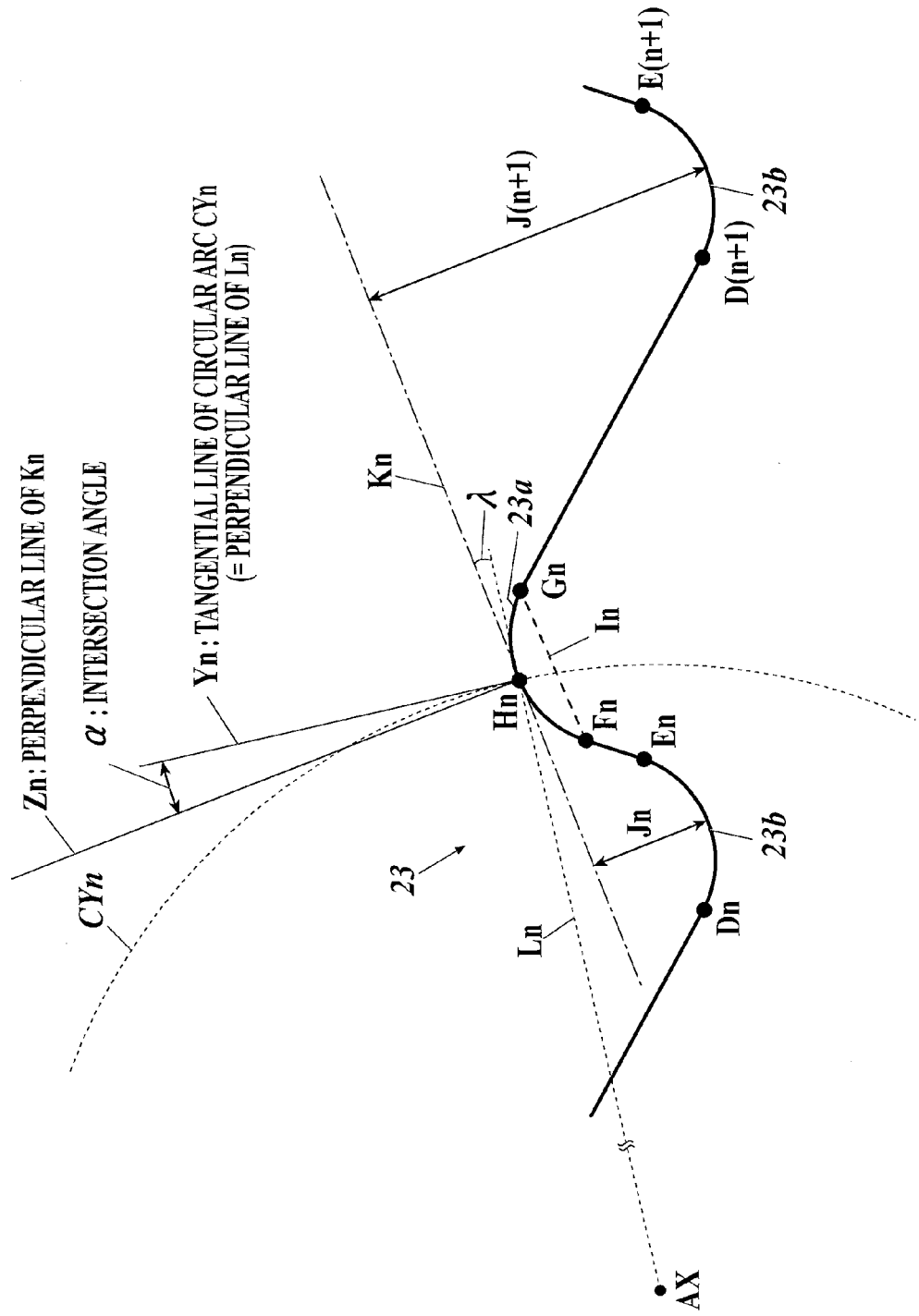
FIG. 8 is an explanatory view showing the cutting edge ridge line of the insert for the milling according to the embodiment of the present invention.

Moreover, as shown in FIG. 8, a virtual chord In that connects both end points of the convex circular arc portion 23a to each other is inclined to the concave circular arc portions 23b closer thereto, which is one of two concave circular arc portions 23b and 23b adjacent to the convex circular arc portion 23a concerned.

As shown in FIG. 8, the respective terminal points of the concave circular arc portion 23b and the convex circular arc portion 23a, which are relatively closely adjacent to each other, are defined as Dn, En, Fn and Gn, the respective terminal points of the concave circular arc portion 23b that is adjacent to the convex circular arc portion 23a relatively far therefrom are defined as D(n+1) and E(n+1), and a midpoint of the convex circular arc portion 23a is defined as Hn.

A tangential line Kn of the convex circular arc portion 23a concerned, which passes through the midpoint Hn, is parallel to the virtual chord In.

The virtual chord In and the tangential line Kn are inclined to the concave circular arc portion 23b closer thereto, that is, to an arc Dn-En. At this time, the matter that the virtual chord In and the tangential line Kn are inclined to the arc Dn-En is synonymous with the matter that depths Jn and J(n+1), which take the tangential line Kn as a reference, have a relationship of Jn<J(n+1). This depth relationship is unchanged even if such a depth reference is changed to a straight line including the virtual chord In.

That is to say, the above shows a state where the virtual chord In of the convex circular arc portion of the cutting edge having the waveform shape is inclined to the inner circumference side of the rotation.

In FIG. 8, with regard to the tangential line Kn, which is in a positional relationship parallel to the virtual chord In and passes through the midpoint Hn, a line segment, which passes through the midpoint Hn and is perpendicular to the tangential line Kn, is defined as a perpendicular line Zn.

Moreover, with regard to a circular arc CYn, which takes the tool revolution axis AX as a center thereof, and takes a distance between the tool revolution axis AX and the midpoint Hn as a radius thereof, a tangential line thereof on the midpoint Hn is defined as a tangential line Yn.

Accordingly, as an intersection angle α between both, that is, the above-described perpendicular line Zn and the above-described tangential line Yn is being smaller, both of them tend to overlap each other more. A situation at this time is expressed as: "the cutting edge with the waveform shape according to the present invention 'is directed to a cutting direction'". As an effect at this time, the cutting resistance is reduced. Hence, the wear advance of the cutting edges is suppressed, and the elongation of the lifetime is achieved.

As described above, the virtual chord In is inclined to the concave circular arc portion 23b closer thereto, which is one of the two concave circular arc portions 23b and 23b adjacent to the convex circular arc portion 23a concerned. This inclination making is effective for avoiding the uneven wear in the convex circular arc portions of the cutting edges, and for the reduction effect of the cutting resistance.

Meanwhile, in the case where the virtual chord is not inclined, the wear of the inner circumference side of the tool revolution advances preferentially, and accordingly, the uneven wear occurs on the convex circular arc portions of the cutting edges, and the cutting edges cause a disadvantage that the lifetime thereof is shortened.

Figure 9:
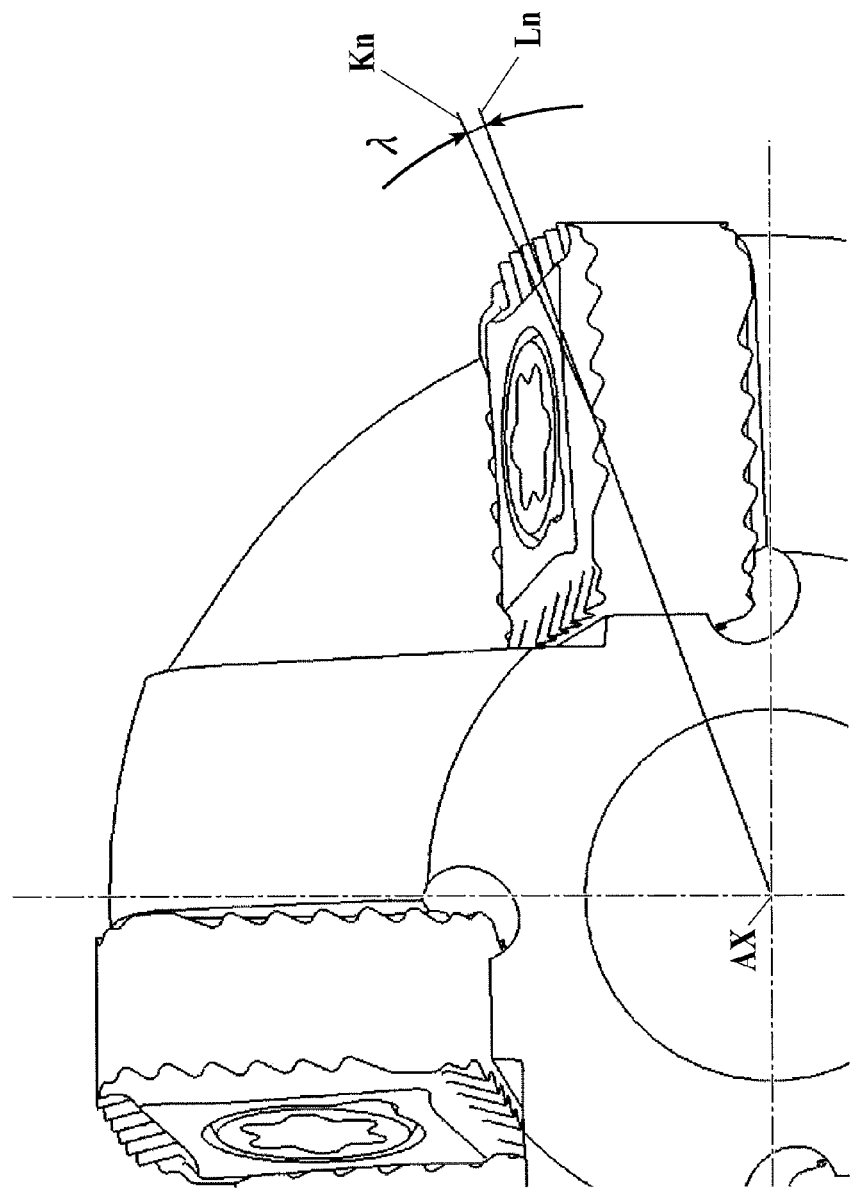
FIG. 9 is a partial enlarged view showing a part of a tip end surface of the indexable face milling cutter according to the embodiment of the present invention.

Moreover, as shown in FIG. 8, when a straight line, which passes through the midpoint Hn and is perpendicular to the tool revolution axis AX, is defined as a straight line Ln, then it is preferable that a deviation angle λ between the tangential line Kn and the straight line Ln, which is shown in FIG. 8 and FIG. 9, be as small as possible. If the deviation angle λ is set within ±5 degrees, then a reduction effect of the cutting resistance, which is practically sufficient, is obtained.

At this time, with regard to such a λ value, a value thereof in a clockwise direction when the straight line Ln is taken as a reference is defined to be positive, and a value thereof in a counterclockwise direction when the straight line Ln is taken as a reference is defined to be negative. Hence, such a λ value shown in FIG. 8 becomes negative.

As described above, the shape of the cutting edge ridge lines is optimized. In such a way, the cutting resistance is reduced, and in addition, the wear resistance of the cutting edges is enhanced, whereby the elongation of the lifetime can be achieved.

Therefore, it is effective to coat a polycrystalline diamond film on the insert.

Moreover, such an insert is also effective, in which a base body is composed of a cemented carbide-made member, and in addition, the cutting edges are composed of a highly hard member made of a cubic boron nitride (CBN) sintered body bonded to the base body. In this case, such an insert is also effective, in which the cutting edges are composed of a highly hard member made of the polycrystalline diamond in place of the cubic boron nitride (CBN).

As described above, the polycrystalline diamond film and the highly hard member are employed, whereby the wear resistance of the cutting edges can be enhanced tremendously.

Figure 10:
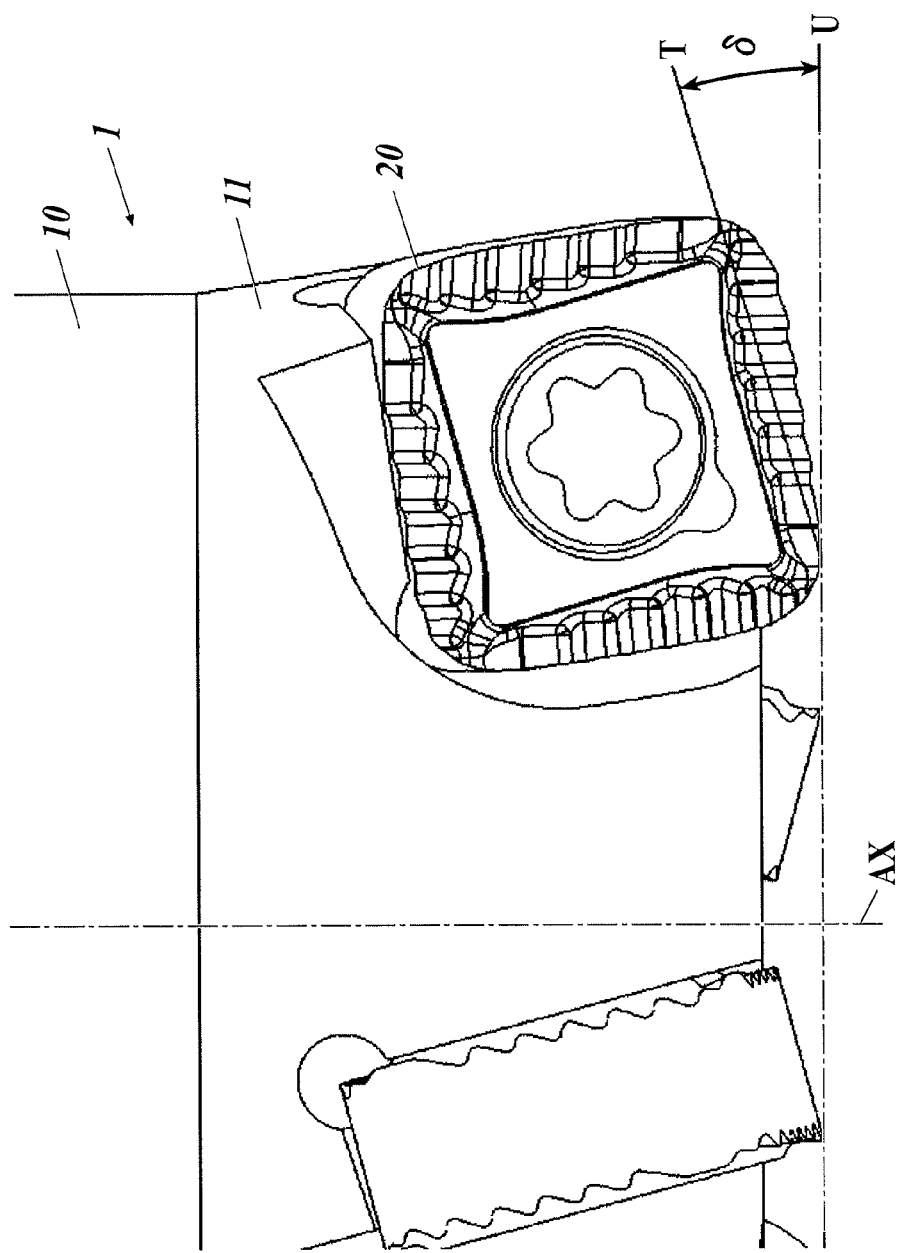
FIG. 10 is a partial enlarged view showing a part of a tip end portion side surface of the indexable face milling cutter according to the embodiment of the present invention.

Moreover, as shown in FIG. 10, an angle made by a line segment T, which connects an outermost circumference point of the insert 20 and a lowest point of the cutting edge in a state where the insert 20 is mounted on the tip end portion 11 of the milling cutter body 10 to each other, and by a plane U, which includes the lowest point and is perpendicular to the tool revolution axis AX, is 5 degrees or more to 30 degrees or less.

Such an insert outermost circumference point is a point of contact between a straight line AX1 (illustrated in FIG. 11) parallel to the tool revolution axis AX and the insert 20. However, this is limited to the case where the polygonal surface of the insert is square.

Accordingly, the angle δ is generally defined.

Figure 11:
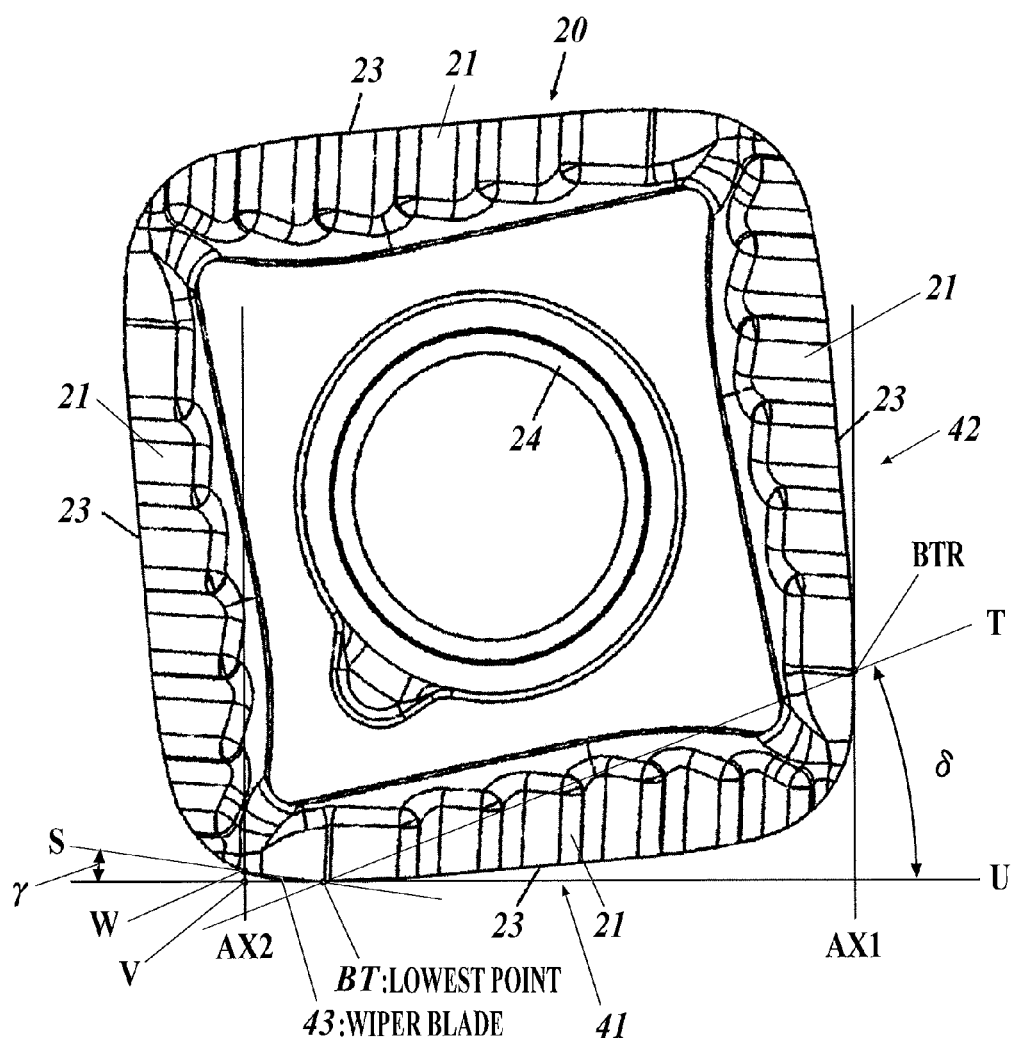
FIG. 11 is a view extracting and showing a polygonal surface of an insert in FIG. 10.

For this, first, an equivalent point BTR shown in FIG. 11 is generally defined.

The equivalent point BTR is a point equivalent to a lowest point BT on a side 42 adjacent to a side 41, which has the lowest point BT, outward in a radius direction of the tool revolution axis AX.

For example, in the case where the polygonal surface of the insert 20 is square with reference to FIG. 11, a destination, to which the lowest point BT moves when the insert 20 is assumed to be rotated by 90 degrees in the counterclockwise direction in FIG. 11, is the equivalent point BTR. This rotation angle of 90 degrees becomes 120 degrees when the insert is equilaterally triangular, becomes 72 degrees, 60 degrees and 45 degrees when the insert is equilaterally pentagonal, equilaterally hexagonal and equilaterally octagonal, respectively, and when being generalized, becomes (360/n) degrees when the insert is equilaterally n-gonal.

The above is complemented while changing the expression. A point that becomes the lowest point in the case where the insert is transferred by being rotated by the (360/n) degrees so that the side 42 adjacent to the side 41, which has the currently lowest point BT, outward in the radius direction of the tool revolution axis AX can be located at the tip end (lower end in the drawing) of the tool is the equivalent point BTR to the currently lowermost point BT. For example, in FIG. 11, when the insert 20 is rotated by 90 degrees so that the side 42 can be located on the tip end (lower end in the drawing) of the tool, the equivalent point BTR moves to the lowest point. Hence, under the present condition before the rotation, which is shown in FIG. 11, the equivalent point BTR is an equivalent point equivalent to the currently lowest point BT.

Without depending on the number of corners of the polygonal surface of the insert, the angle δ is defined as the angle made by the line segment T, which connects the lowest point BT and the equivalent point BTR to each other, and by the plane U, which includes the lowest point and is perpendicular to the tool revolution axis AX.

It is preferable that the angle δ be 5 degrees or more to 30 degrees or less. The insert having the cutting edge ridge lines 23 with the above-mentioned shape is applied within this range, whereby performance of the insert can be exerted.

For example, the cutting resistance is increased by the matter that the δ value is increased, and following this, there occurs a disadvantage that a damage by boundary wear particularly in a boundary portion where the cutting load becomes high is increased, and accordingly, it is preferable to set an upper limit value of the δ value at 30 degrees.

Figure 4C:
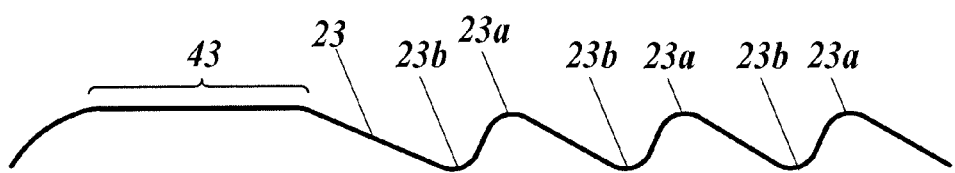
FIG. 4C is an enlarged view of a portion of a cutting edge ridge line shown in FIG. 4B, the portion including a wiper edge.

Moreover, as shown in FIG. 4B and FIG. 4C, the cutting edges which define, as the cutting edges thereof, the ridge lines 23 of the insert 20 of this embodiment include the waveform-like cutting edges in the waveform-like range where the concave circular arc portions 23b and the convex circular arc portions 23a are alternately repeated. Besides the waveform-like cutting edges described above, the cutting edges include wiper edges 43 between the waveform-like cutting edges and the corners of the polygonal surface of the insert 20.

Functions of the wiper edges are to cut and remove irregularities on a surface of a workpiece material, which are formed by the waveform-like cutting edges in advance following that the tool is fed in the radius direction at the time of the cutting, and to flatten the surface concerned.

Hence, finished surface roughness as a surface morphology of the workpiece material can be enhanced by the wiper edges. In terms of shape, it is preferable that the wiper edges be linear cutting edges, polyline-like cutting edges in which a plurality of straight lines are combined with one another, or circular-arc cutting edges having a large radius. The finished surface roughness is not largely affected even if the shape of the wiper edges is a combination of the linear shape and the circular arc shape.

Anyway, as shown in FIG. 11, under conditions where the plane U which includes the lowest point BT of the cutting edges and is perpendicular to the tool revolution axis AX is taken as an angle reference, and where the lowest point BT is taken as an observation point, it is preferable that each of the wiper edges 43 be formed over a predetermined length within a range where an angle of elevation γ is 1 degree or less. This is in order to impart effects to the above-mentioned functions. In the case where such a γ value becomes larger than 1 degree, the removal of the irregularities on the surface of the workpiece material becomes imperfect, and there occurs such a disadvantage that the surface of the workpiece material cannot be formed into a flat shape.

In FIG. 11, when an intersection point between a straight line S, which passes through the lowest point BT and makes the angle γ (1 degree or less) with the plane U, and the cutting edge ridge line 23 is defined as a point W, and an intersection point between a straight line AX2, which passes through the point W and is parallel to the tool revolution axis AX, and the plane U is defined as a point V, each of the wiper edges is formed from the lowest point BT to the point W. It is convenient that the above-described predetermined length of the wiper edge is defined by a length obtained when the wiper edge is perpendicularly projected onto the plane U, that is, by a distance from the lowest point BT to the point V.

It is preferable that the predetermined length of the wiper edge be set at a distance from the lowest point BT to the point V, which is a radial feed rate per revolution or more. This is because, if the predetermined length is shorter than the feeding amount concerned, then a surface of the workpiece material, on which the wiper edge does not pass, occurs, and the irregularities are partially left unremoved. Note that, also in the case where the plurality (four in this embodiment) of inserts are attached in the circumferential direction, variations occur in cut depth among the respective inserts owing to an attachment error and a formation error, and accordingly, it is necessary to make design on the assumption that the irregularities as those left unremoved after the cutting using the waveform-like cutting edges of one insert must be cut off by the wiper edges of the one insert itself. Therefore, the predetermined length is regulated by such "per revolution of the tool".

For example, the wiper edge 43 is formed with a length ranging from 1.0 mm to 1.5 mm from the lowest point BT to such an extension point W in the tool center direction.

When the insert including the waveform-like cutting edges and the wiper edges is mounted on the tool body 10, it is preferable that the waveform-like cutting edges be provided outward in the radius direction of the tool revolution axis AX from the lowest point BT of the cutting edges and that the wiper edge be provided inward in the radius direction from the lowest point BT thereof. In such a case, each wiper edge functions effectively, whereby there can be obtained the effect of removing burrs owing to delamination and the above-mentioned irregularities, and of enhancing the finished surface roughness of the surface of the workpiece material.

Example 1

A disclosure is made below of a first test for confirming effectiveness of the present invention.

In the first test, inserts of present invention examples (sample numbers 1 to 7), comparative examples (samples 8 to 10) and conventional examples (samples 11 to 13) were individually fabricated, were individually attached to the tool body, and were subjected to a cutting test.

Table 1 shows shape features of cutting edges of the respective samples and conditions regarding attachment angles (the above-described angle λ and angle δ). Table 2 shows evaluation results of the respective samples. In any of the samples, cemented carbide was used as a raw material of the cutting edges.

A tool body to be applied to this test was fabricated so that the inserts could be attached thereto while setting the axial rake angle (Ar) of the inserts at −15 degrees and setting the radial rake angle (Rr) thereof at −17 degrees. Moreover, a cutter diameter (mm) of a milling cutter was set at Φ25, and the number of attached inserts was set at four.

TABLE 1

| | | | Feature of Cutting edge Shape | | | | | | |
|---|---|---|---|---|---|---|---|---|---|
| | | | Circular arc length | | Is concave | | Coupled state between convex circular arc portion and concave circular arc portion | | |
| | | | | | | | Coupled to | Coupled to | |
| Sample Number | | Cutting edge | Convex circular arc portion | Concave circular arc portion | circular arc portion unevenly located? | Not regulated | far convex circular arc portion by straight line | close convex circular arc portion by straight line | Directly coupled to close convex circular arc portion |
| Present invention example | 1 | waveform shape | 1/4 | 1/4 | yes | free-form curve | — | — | — |
| | 2 | waveform shape | 1/4 | 1/4 | yes | free-form curve | — | — | — |

TABLE 1-continued

|  |  |  | waveform shape | 1/3 | 1/3 | yes | free-form curve | — | — | — |
|---|---|---|---|---|---|---|---|---|---|---|
|  |  | 4 | waveform shape | 1/4 | 1/4 | yes | — | ○ | ○ | — |
|  |  | 5 | waveform shape | 1/4 | 1/4 | yes | — | ○ | — | ○ |
|  |  | 6 | waveform shape | 1/4 | 1/4 | yes | — | ○ | ○ | — |
|  |  | 7 | waveform shape | 1/4 | 1/4 | yes | — | ○ | ○ | — |
| Comparative example | 8 | waveform shape | 5/12 | 5/12 | yes | — | ○ | ○ | — |
|  | 9 | waveform shape | 1/6 | 1/6 | yes | — | ○ | ○ | — |
|  | 10 | waveform shape | 1/4 | 1/4 | no | — | — | — | ○ |
| Conventional example | 11 | sine wave | — | — | no | — | — | — | — |
|  | 12 | straight line | — | — | — | — | — | — | — |
|  | 13 | circular arc (solid die) | — | — | — | — | — | — | — |

| | Sample Number | | Feature of Cutting edge Shape Inclined direction of virtual chord | Attached State Angle λ: within ±5 degrees | Feature of Cutting edge Shape Pitch of waveform shape | Attached State Angle (δ) |
|---|---|---|---|---|---|---|
| Present invention example | 1 | | closer concave circular arc portion | 10 degrees | equal pitch | 20 degrees |
| | 2 | | closer concave circular arc portion | 1 degrees | equal pitch | 10 degrees |
| | 3 | | closer concave circular arc portion | 1 degrees | equal pitch | 20 degrees |
| | 4 | | closer concave circular arc portion | 1 degrees | equal pitch | 10 degrees |
| | 5 | | closer concave circular arc portion | 1 degrees | equal pitch | 10 degrees |
| | 6 | | closer concave circular arc portion | 1 degrees | gradually narrower | 20 degrees |
| | 7 | | closer concave circular arc portion | 1 degrees | gradually narrower | 30 degrees |
| Comparative example | 8 | | closer concave circular arc portion | 1 degrees | gradually narrower | 10 degrees |
| | 9 | | closer concave circular arc portion | 1 degrees | gradually narrower | 20 degrees |
| | 10 | | no inclination | 12 degrees | gradually narrower | 10 degrees |
| Conventional example | 11 | — | | — | — | 10 degrees |
| | 12 | — | | — | — | 90 degrees |
| | 13 | — | | — | — | 45 degrees |

TABLE 2

| | Sample Number | Evaluation | | |
|---|---|---|---|---|
| | | Tool lifetime | Cutting resistance | Integrated evaluation |
| Present invention example | 1 | ○ | ○ | ○ In comparison with the conventional examples and the comparative examples, the wear amount was small, and the cutting resistance was able to be reduced. |
| | 2 | ◎ | ◎ | ◎ In comparison with Example 1, the wear amount was small, and the cutting resistance was also able to be reduced. |
| | 3 | ○ | ◎ | ◎ In comparison with Example 2, the cutting resistance was lowered a little; however, the micro chipping occurred on the vertices of the convex circular arc portions. |
| | 4 | ◎ | ◎ | ◎ Results substantially similar to those of Example 2 were obtained. |
| | 5 | ◎ | ◎ | ◎ Results substantially similar to those of Example 2 were obtained. |
| | 6 | ◎ | ◎ | ◎ Results substantially similar to those of Examples 2, 4 and 5 were obtained: however, the damage state of the major flank notch became good. |
| | 7 | ○ | ○ | ○ In comparison with Example 6, the damage of the major flank notch was increased. Following this, the cutting resistance was also increased a little. |

TABLE 2-continued

| Sample Number | | Tool lifetime | Cutting resistance | Evaluation Integrated evaluation | |
|---|---|---|---|---|---|
| Comparative example | 8 | X | ⊚ | X | Since the wedge angle of the convex circular arc portions was 30 degrees, the resistance was lowered; however, the convex circular arc portions were chipped off owing to shortage of the strength. |
| | 9 | ○ | Δ | Δ | Since the wedge angle of the convex circular arc portions was 120 degrees, the cutting resistance was not reduced to a large extent. |
| | 10 | Δ | Δ | Δ | The wear state of the inner circumference left side of the convex circular arc portions was particularly deteriorated. The cutting resistance was not able to be reduced so much, either. |
| Conventional example | 11 | Δ | Δ | Δ | The wear state of the inner circumference left side of the convex circular arc portions was particularly deteriorated. The cutting resistance was not able to be reduced so much, either. |
| | 12 | X | X | X | The wear advance of the nose R portion was particularly large, also resulting in a short lifetime. The cutting resistance was also high. |
| | 13 | X | X | X | The advance of the major flank notch was particularly large, also resulting in a short lifetime. |

This cutting test was carried out mainly in order to confirm the influence which the shape differences among the cutting edges give to the cutting performance, and accordingly, the cutting was conducted under Cutting conditions 1 to be described below. Note that, in the event of the evaluation of the cutting resistance, the cutting resistance during the cutting was measured by reading resistance values in a main shaft load meter of a machining center for use. Moreover, the tool lifetime was evaluated by observing each tool wear state at the time of a process at a constant distance.

In the evaluation results of the cutting resistance in Table 2, reference mark ⊚ (double circle) denotes that a load of the main shaft load meter was 7% or less, reference mark ○ (single circle) denotes that the same load was 8 to 9%, reference symbol Δ (triangle) denotes that the same load was 10 to 11%, and reference symbol x (cross) denotes that the same load was 12% or more.

With regard to the evaluations of the lifetime, which are shown in Table 2, results thereof were evaluated by maximum flank wear widths (mm) (VBmax values). Reference mark ⊚ (double circle) denotes that the maximum flank wear width (VB) of the tool was 0.10 mm or less, reference mark ○ (single circle) denotes that the value VB was 0.10 to 0.15, reference mark Δ (triangle) denotes that the value VB was 0.15 to 0.2, and reference mark x (cross) denotes that the value VB was 0.2 or more.

(Cutting Condition 1)
Workpiece material: carbon fiber reinforced plastics (plate material)
Cutting speed: 300 m/min.
Number of revolutions of main shaft: 3822 revolutions/min.
Axial cut depth: 0.5 mm
Radial cut depth: 16 mm
Feed rate per tooth: 0.18 mm
Feed rate per min. of table: 2752 mm/min.
Cutting distance: 5 m
Processing method: face milling process The insert of Present invention example 1 has the waveform-like cutting edges, in which both of the convex circular arc portions and concave circular arc portions of the cutting edge ridge lines were formed into the ¼ circular arc as shown in Table 1. The circular arc radius of the convex circular arc portions and the concave circular arc portions was set at 0.15 mm. As shown in FIG. 5A, in the waveform-like cutting edges of Present invention example 1, the concave circular arc portion was set in a state of having two convex circular arc portions adjacent thereto and of being unevenly located.

That is to say, the concave circular arc portion 23b was set in a state of being unevenly located at the position close to one (that is, the convex circular arc portion 23a including the upper vertex C) of the two convex circular arc portions 23a and 23a, which are adjacent thereto, and far from the other (that is, the convex circular arc portion 23a including the upper vertex A) of the two convex circular arc portions 23a and 23a concerned.

The respective convex circular arc portions and the respective concave circular arc portions were coupled to each other by the free-form curves. The virtual chord (corresponding to In in FIG. 8) of the convex circular arc portion was inclined to the concave circular arc portion closer thereto, which was one of the two concave circular arc portions adjacent to the convex circular arc portion concerned. This is equivalent to that the virtual chord In of the convex circular arc portion of the cutting edge having the waveform shape was inclined to the inner circumference side of the rotation.

The pitch interval (corresponding to R in FIG. 5B) was set at an equal pitch, and a pitch amount thereof was set at approximately 0.9 mm. Moreover, the λ value and δ value of the angles (degrees) when the insert of Present invention example 1 was mounted on the tool body were set at +10 degrees and +10 degrees, respectively. Samples of Present invention examples 2 to 7 and Comparative examples 8 to 10 were also fabricated in a similar procedure to Present invention example 1 except for requirements shown in Table 1.

In the result of the cutting evaluation, Present invention example 1 was excellent in wear resistance since the wear amount thereof was small. Moreover, Present invention example 1 had a reduction effect of the cutting resistance, was superior to Comparative examples and Conventional examples, and exhibited high performance.

By setting the λ value at +1 degree, Present invention example 2 was far more excellent in wear resistance, and further, exhibited normal wear which was even over the whole of the cutting edges. Moreover, Present invention example 2 had the reduction effect of the cutting resistance, and obtained a superior result of the cutting evaluation to that of Present invention example 1.

By changing the λ value from +10 degrees to +1 degree, the uneven wear of the convex circular arc portions was avoided, and uniformity thereof was ensured, whereby the wear amount was reduced.

In Present invention example 3, both of the convex circular arc portions and the concave circular arc portions, which compose the cutting edge ridge lines, were formed into the ⅓ circular arc, and a circular arc radius thereof was set at 0.15 mm. The convex circular arc portions and the concave circular arc portions were formed into the ⅓ circular arc, whereby, in comparison with Present invention example 2 set at the ¼ circular arc, the cutting resistance was lowered a little, and a good wear state was exhibited.

However, the micro chipping occurred in the vicinities of the vertices of the convex circular arc portions, whereby it was assumed that the strength of the cutting edges was lowered.

In Present invention example 4, the convex circular arc portions and the concave circular arc portions were coupled to each other by the straight lines, and in Present invention example 5, the convex circular arc portion far from the concave circular arc portion was coupled thereto by the straight line, and the convex circular arc portion close to the concave circular arc portion was directly coupled thereto. Present invention examples 4 and 5 exhibited substantially equivalent performance to that of Present invention example 2 in which the respective convex circular arc portions and the respective concave circular arc portions were coupled to each other by the free-form curves.

In Present invention example 6, refinement was further added to the shape of Present invention example 4, and the pitch interval (corresponding to R in FIG. 5B) indicating the interval between the waveform-like convex circular arc portions was set so as to become a gradually narrower pitch. This pitch interval was set so as to become a gradually narrower pitch in the direction from the inner circumference side of the tool revolution toward the outer circumference side thereof in a state where the insert was mounted on the tool body. Specifically, a pitch on the innermost circumference side of the tool revolution was set at approximately 0.9 mm, and as going toward the outer circumference side, the pitch amount thereof was reduced by approximately 3 to 10% pitch by pitch.

As a result, the damage by the boundary wear of the cutting edges was reduced, and good results were exhibited. With regard to this, it is conceived that, on the outer circumference portion where the cutting load becomes the highest during the process, the pitch thereof becomes a narrow pitch, whereby the cutting resistance during the process was reduced, resulting in the good wear state. It is conceived that Present invention example 6 has the most preferable form as the shape of the cutting edges of the insert in the present invention.

Present invention example 7 showed evaluation results in the case where the δ value was set at 30 degrees in order to investigate the influence of the δ value. In comparison with Present invention example 6 in which the δ value was 10 degrees, in Present invention example 7, the damage by the boundary wear was large, and the cutting resistance was increased. With regard to this, causes thereof are conceived to be that a contact length between the tool and a workpiece was reduced by the fact that the δ value became large, and that the waveform-like cutting edges effective for the cutting were reduced thereby. Therefore, as the cutting resistance was being increased, the damage by the boundary wear particularly on the boundary portion where the cutting load became high was increased.

In Comparative example 8, both of the convex circular arc portions and the concave circular arc portions were set at the 5/12 circular arc, and in Comparative example 9, both of the convex circular arc portions and the concave circular arc portions were set at the ⅙ circular arc. A circular arc radius in both of the circular arc portions was set at 0.15 mm. In Comparative example 8, both of the convex circular arc portions and the concave circular arc portions were set at the 5/12 circular arc, whereby the reduction of the cutting resistance was achieved; however, the strength of the cutting edges became insufficient, and accordingly, chipping were observed on a part of the convex circular arc portions.

Moreover, in Comparative example 9, both of the convex circular arc portions and the concave circular arc portions were set at the ⅙ circular arc, whereby the reduction effect of the cutting resistance was not able to be obtained.

Comparative example 10 is an insert having the cutting edge ridge lines in which each virtual chord of the convex circular arc portions is not inclined. That is to say, in Comparative example 10, the λ value is decided by a difference thereof from the radial rake angle (Rr) of the tool body with respect to the reference line. Here, the radial rake angle of the tool body was −17 degrees, and accordingly, the λ value becomes +17 degrees in the case where the virtual chord is not inclined.

In accordance with a cutting test, the virtual chord was not inclined, whereby the uneven wear occurred on the convex circular arc portions. In particular, the wear on the left side (inner circumference side in the tool revolution) of the convex circular arc portions advanced preferentially, and accordingly, the lifetime of the cutting edges was shortened. Moreover, the reduction effect of the cutting resistance was not able to be obtained, either.

In Conventional example 11, a sine wave shape was used as the waveform shape. As the sine wave shape, a shape similar to that of Comparative example 10 was employed, in which one cycle of the wave was set at approximately 1.8 mm, and amplitude of the wave was set at approximately 0.9 mm. Also in this case, in a similar way to the case of Comparative example 10, the uneven wear occurred on the concave circular arc portions of the cutting edges. In particular, the wear on the left side (inner circumference side in the tool revolution) of the convex circular arc portions advanced preferentially, and accordingly, the lifetime of the cutting edges was shortened. The reduction effect of the cutting resistance was not able to be obtained, either.

In Conventional example 12, a linear shape was used as the shape of the cutting edges, in which the δ value was set at 90 degrees. When an wear state after the cutting test was observed, the wear advance at the nose R portion of the insert was large, resulting in the shortening of the lifetime. Moreover, the reduction effect of the cutting resistance was not able to be obtained, either.

In Conventional example 13, circular-arc cutting edges were used, in which the δ value was set at 45 degrees. When the wear state after the cutting test was observed, the advance of the boundary wear was large, resulting in the shortening of the lifetime.

Example 2

Next, a second test for confirming the effectiveness of the present invention is disclosed.

In the second test, based on Present invention example 6 including the form of the most preferable cutting edge shape in the above-described first test, evaluations were carried out for differences depending on whether or not the coating was implemented and on which raw material was used for the cutting edge portion. For the evaluations, three types of inserts according to Present invention example 6, Present invention example 14 and Present invention example 15 were fabricated, were subjected to the cutting test, and were compared and evaluated with one another.

Present invention example 14 includes the cutting edge shape of Present invention example 6, in which a polycrystalline diamond film was coated on at least the cutting edge portion.

Present invention example 15 includes the cutting edge shape of Present invention example 6, in which polycrystalline diamond was used as the raw material of the cutting edge portion. At this time, the base body of the insert was composed of the cemented carbide-made member, and the cutting edge portion was bonded to the base body of the insert by brazing.

Table 3 shows conditions and evaluation results of this test.

TABLE 3

| | | Feature of Cutting edge Raw Material | | | | Evaluation | | |
|---|---|---|---|---|---|---|---|---|
| Sample Number | | Cemented carbide | Diamond coating | Cutting edge raw material (CBN) (diamond) | Attached State Angle (δ) | Tool lifetime | Price | Integrated evaluation |
| Present invention example | 6 | ○ | — | — | 10 degree | Δ | ⊚ | ○ The shape of the insert shape takes the best form; however, the tool lifetime is inferior since there is no coating. |
| | 14 | ○ | ○ | — | 10 degree | ○ | ○ | ⊚ The lifetime is approximately 10 times that of Example 6; however, the price also becomes approximately 10 times, and running cost becomes the same as that of Example 6; however, a frequency of tool exchange is saved. |
| | 15 | — | — | ○ (PCD: Diamond) | 10 degree | ⊚ | X | Δ The lifetime is approximately 30 times that of Example 6; however, the price also becomes approximately 30 times. However, since a usable corner is one (because of brazing), a cost increase is brought about when a unit price of the corner is taken into consideration. |

This cutting test was carried out in order to confirm an influence to be given to the cutting performance depending on whether or not there was a polycrystalline diamond film and on which raw material was used for the cutting edge portion. Accordingly, the cutting was performed under Cutting conditions 2 to be described below. The evaluations were carried out under a condition where, as an end of the tool lifetime, there was defined the point of time when the maximum roughness Rz of the workpiece surface roughness becomes 20 μm or more, or when the delamination was confirmed on the carbon fiber reinforced plastics as the workpiece.

In the evaluation results of the tool lifetime, which are shown in Table 3, reference mark ⊚ (double circle) denotes that the tool lifetime is 30 minutes or more, reference mark ○ (single circle) denotes that the tool lifetime is 15 to 30 minutes, and reference symbol t (triangle) denotes that the tool lifetime is 15 minutes or less.

(Cutting Condition 2)

Workpiece material: carbon fiber reinforced plastics (plate material)

Cutting speed: 600 m/min.

Number of revolutions of main shaft: 7643 revolutions/min.

Axial cut depth: 0.5 mm

Radial cut depth: 16 mm

Feed rate per tooth: 0.18 mm

Feed rate per min. of table: 5503 mm/min.

Processing method: face milling process

In Present invention example 14, a polycrystalline diamond film was coated on an insert with the same shape as that of Present invention example 6. Coating conditions in this case are shown below.

The insert of Present invention example 6 was set in a furnace of a coating apparatus, and on a surface thereof, a polycrystalline diamond film with a thickness of approximately 6 to 10 μm was deposited by a hot filament CVD method.

A current was applied to a tungsten-made filament arranged on the periphery of the insert, whereby the filament was heated up to an approximate range from 2000 to 2500° C., and the polycrystalline diamond film was deposited in such ranges where a gas flow rate ratio of methane with respect to hydrogen ($CH_4/H_2$) was 0.1% to 3%, an in-furnace pressure was 0.5 to 1.0 kPa, and a base body temperature was 700° C. to 800° C.

The coating was carried out under the above-described deposition conditions, whereby the wear resistance of the polycrystalline diamond film was maintained, and a polycrystalline diamond-coated insert excellent in delamination resistance was fabricated.

As a result of carrying out the cutting evaluations by using the fabricated insert, the lifetime of the insert exhibited a lifetime as long as approximately 10 times that of Present invention example 6 provided with no coating of such a polycrystalline diamond film. With regard to the polycrystalline diamond film, a deposition time thereof is long, and deposition cost thereof also becomes extremely high, and accordingly, a price thereof becomes approximately 10 times that of the insert without the film. However, the polycrystalline diamond film was coated, whereby a cutting distance per corner was lengthened, and accordingly, a frequency of tool exchange is reduced, and this is effective for reducing running cost.

Shown below are fabrication conditions for Present invention example 15, which is provided with the cutting edge shape of Present invention example 6, in which the polycrystalline diamond was used as the raw material of the cutting edge portion.

The waveform-like cutting edges were provided by the polycrystalline diamond. In the process of the carbon fiber reinforced plastics, the delamination becomes an important problem in terms of quality thereof, and accordingly, for the cutting edge shape, a sharp edge shape in which sharpness is regarded as important is suitable. Therefore, with regard to the cutting edge shape of the polycrystalline diamond, which was applied to the present invention, the shape concerned was processed by the cutting, and thereafter, the cutting test was carried out without performing cutting edge treatment.

Note that the cutting edge portion made of the polycrystalline diamond was bonded to base metal of the base body of the insert, which was composed of the cemented carbide-made member, by being subjected to brazing treatment. With regard to the brazing, the base body of the insert and the waveform-like cutting edge portion were prepared, and both were bonded to each other by brazing by using a brazing material. A thickness of the brazing material on the bonded surface at this time was set within an approximate range from 20 to 30 µm.

By using the fabricated insert of Present invention example 15, a cutting test was carried out for the evaluation in a similar way. As a result, the lifetime of the insert exhibited a lifetime as long as approximately 30 times that of Present invention example 6 made of the cemented carbide. However, in the case of molding the waveform-like cutting edges by the cutting by using the polycrystalline diamond, fabrication cost thereof becomes extremely enormous, and a price thereof becomes approximately 30 times that of a usual insert using the cemented carbide as a base. Moreover, with regard to the insert fabricated by brazing the polycrystalline diamond, the number of corners thereof for use becomes one in usual. Therefore, when a unit price of the corner is taken into consideration, cost of the insert of Present invention example 15 becomes comparatively higher than that of the insert coated with the diamond film in some case.

INDUSTRIAL APPLICABILITY

The present invention can be suitably used for the milling, and in particular, for the milling of the fiber reinforced plastics (FRP).

EXPLANATION OF REFERENCE NUMERALS

1 INDEXABLE FACE MILLING CUTTER
10 MILLING CUTTER BODY
11 TIP END PORTION
20 MILLING INSERT
21 RAKE FACE
21a MOUNT PORTION
21b VALLEY PORTION
22 FLANK
23 CUTTING EDGE RIDGE LINE
23a CONVEX CIRCULAR ARC PORTION
23b CONCAVE CIRCULAR ARC PORTION
AX TOOL REVOLUTION AXIS
Hn MIDPOINT
In VIRTUAL CHORD
Kn TANGENTIAL LINE
M ROTATION DIRECTION
R PITCH

The invention claimed is:

1. A milling insert, comprising:
an insert body having a polygonal tabular shape, the insert body comprising:
rake faces provided on one polygonal surface of the insert body;
flanks composed of circumferential surfaces adjacent to the polygonal surface; and
cutting edges defining a ridge line where the rake faces and the flanks intersect each other,
wherein, the rake faces include serrations having pluralities of mount portions and valley portions that are arrayed alternately to intersect the cutting edges,
wherein, when the flanks are viewed along an axis transverse to a longitudinal axis of the insert body, the ridge line has a waveform shape in which bottom portions and top portions are formed into concave circular arc portions and convex circular arc portions, respectively, and are alternately repeated,
wherein, both of the concave circular arc portions and the convex circular arc portions are a ¼ circular arc or more to a ⅓ circular arc or less,
wherein, each concave circular arc portion that is located between two adjacent convex circular arc portions is positioned so as to be closer to one of the two adjacent convex circular arc portions and farther from the other of the two adjacent convex circular arc portions, and
wherein the ridge line is formed with a pitch that narrows as the ridge line extends in a direction corresponding with an arc sequence of: farther-spaced convex circular arc portion, concave circular arc portion, closer-spaced convex circular arc portion, and the pitch gradually narrows over at least three iterances of the arc portion sequence.

2. The milling insert according to claim 1, wherein the ridge line is shaped such that a concave circular arc portion is connected by a straight line to the farther-spaced of two adjacent convex circular arc portions on opposite sides of the concave circular arc portion.

3. The milling insert according to claim 2, wherein the ridge line is shaped such that the concave circular arc portion is connected by a straight line to the closer-spaced of the two adjacent convex circular arc portions on opposite sides of the concave circular arc portion.

4. The milling insert according to claim 2, wherein the ridge line is shaped such that the concave circular arc portion is directly connected to the closer-spaced of the two adjacent convex circular arc portions on opposite sides of the concave circular arc portion.

5. The milling insert according to claim 1, wherein a virtual chord that connects both end points of a convex circular arc portion to each other is inclined relative to a closer-spaced of two adjacent concave circular arc portions on opposite sides of the convex circular arc portion.

6. The milling insert according to claim 5, wherein the milling insert is configured so as to be attachable to a body of a rotational cutting tool while setting, within ±5 degrees, a deviation angle between a tangential line of a convex circular arc portion, the tangential line passing through a midpoint of the convex circular arc portion, and a straight line that passes through the midpoint and is perpendicular to a tool revolution axis.

7. The milling insert according to claim 1, wherein the milling insert is coated with a polycrystalline diamond film.

8. The milling insert according to claim 1, wherein
a base body of the milling insert is composed of a cemented carbide-made member, and the cutting edges are composed of a member made of:
cubic boron nitride sintered body bonded to the base body, or
polycrystalline diamond bonded to the base body.

9. The milling insert according to claim 1, wherein the cutting edges include wiper edges between a range of the waveform shape, in which the concave circular arc portions and the convex circular arc portions are alternately repeated, and corners of the polygonal surface.

10. A cutting tool, comprising
an indexable face milling cutter having a milling cutter body, and
the milling insert according to claim 1 detachably attachable to a tip end portion of the milling cutter body and configured to be rotationally driven when attached to the tip end portion of the milling cutter body.

11. The cutting tool according to claim 10, wherein
in a state where the milling insert is mounted on the tip end portion of the milling cutter body, there is an angle ($\delta$) measuring $5° \leq \delta \leq 30°$, the angle ($\delta$) being defined by:
a line segment that connects a lowest point of the cutting edges and an equivalent point on a side of the polygon shape that is adjacent to and radially outward, relative to the tool revolution axis, from the side including the lowest point, and
a plane that includes the lowest point and is perpendicular to the tool revolution axis.

12. The cutting tool according to claim 10,
wherein the insert is attached to the milling cutter body with a deviation angle measuring ±5 degrees, the deviation angle being an angle between a tangential line of a convex circular arc portion, the tangential line passing through a midpoint of the convex circular arc portion, and a straight line that passes through the midpoint and is perpendicular to a tool revolution axis.

13. A cutting tool, comprising
an indexable face milling cutter having a milling cutter body, and
the milling insert according to claim 9 detachably attachable to a tip end portion of the milling cutter body to be rotationally driven when attached to the tip end portion of the milling cutter body,
wherein, in a state where the milling insert is mounted on the tip end portion of the milling cutter body, under conditions where a plane that includes a lowest point of the cutting edges and is perpendicular to a tool revolution axis is taken as an angle reference, and where the lowest point is taken as an observation point, each of the wiper edges is formed over a predetermined length within a range where an angle of elevation is 1 degree or less.

* * * * *